March 31, 1953     L. S. WILLIAMS     2,633,350
WEIGHING SCALE PENDULUM
Filed Feb. 27, 1947     11 Sheets-Sheet 1
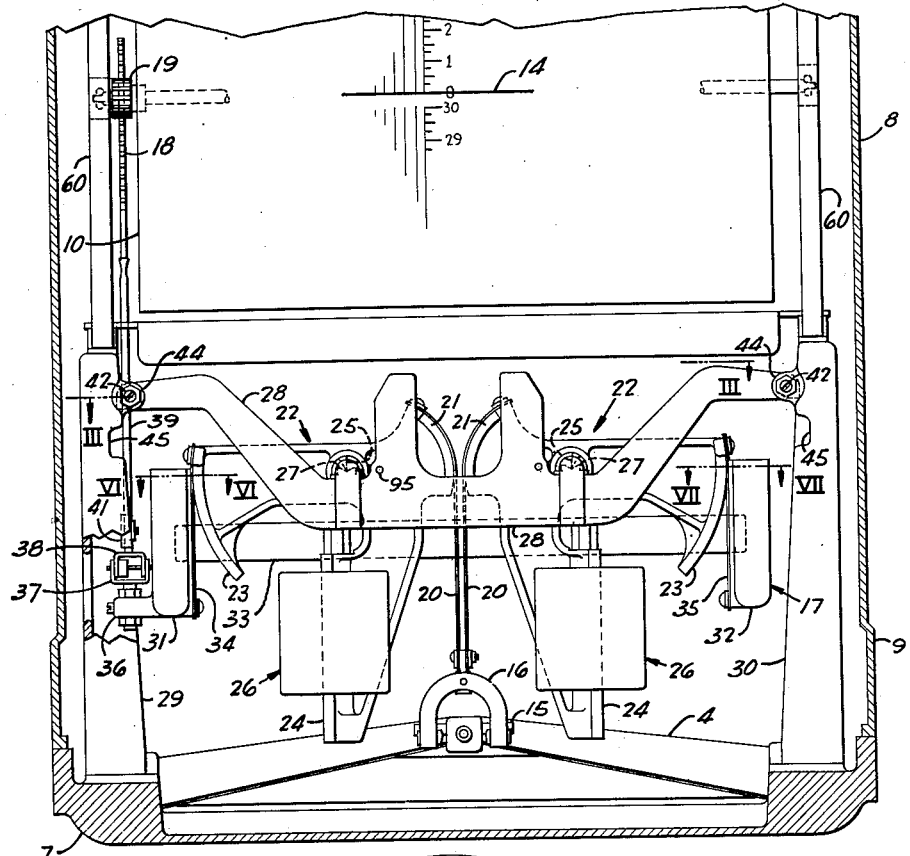
Fig. II
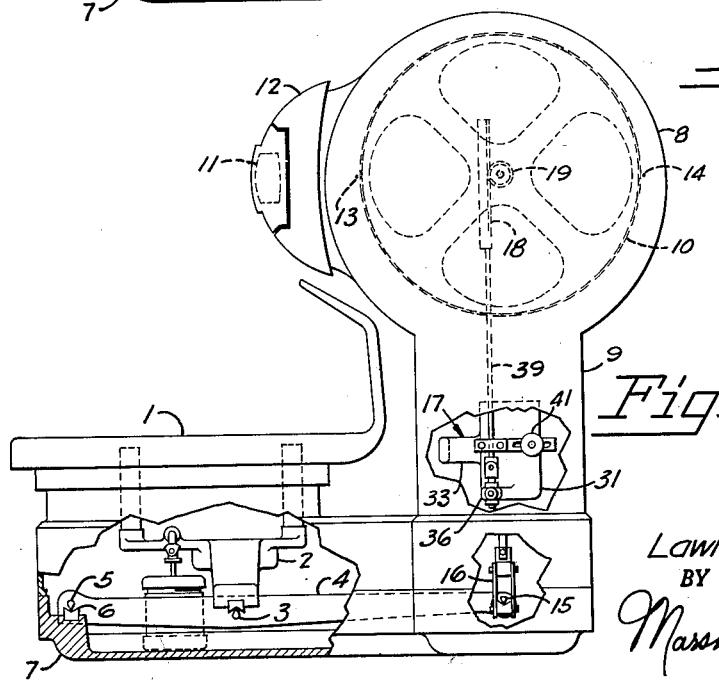
Fig. I
INVENTOR.
Lawrence S. Williams
BY
Marshall and Marshall
ATTORNEYS March 31, 1953   L. S. WILLIAMS   2,633,350
WEIGHING SCALE PENDULUM
Filed Feb. 27, 1947   11 Sheets-Sheet 2
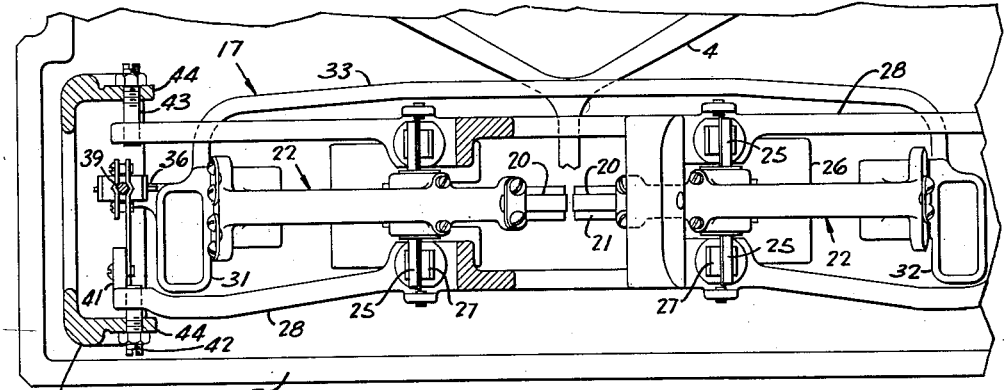
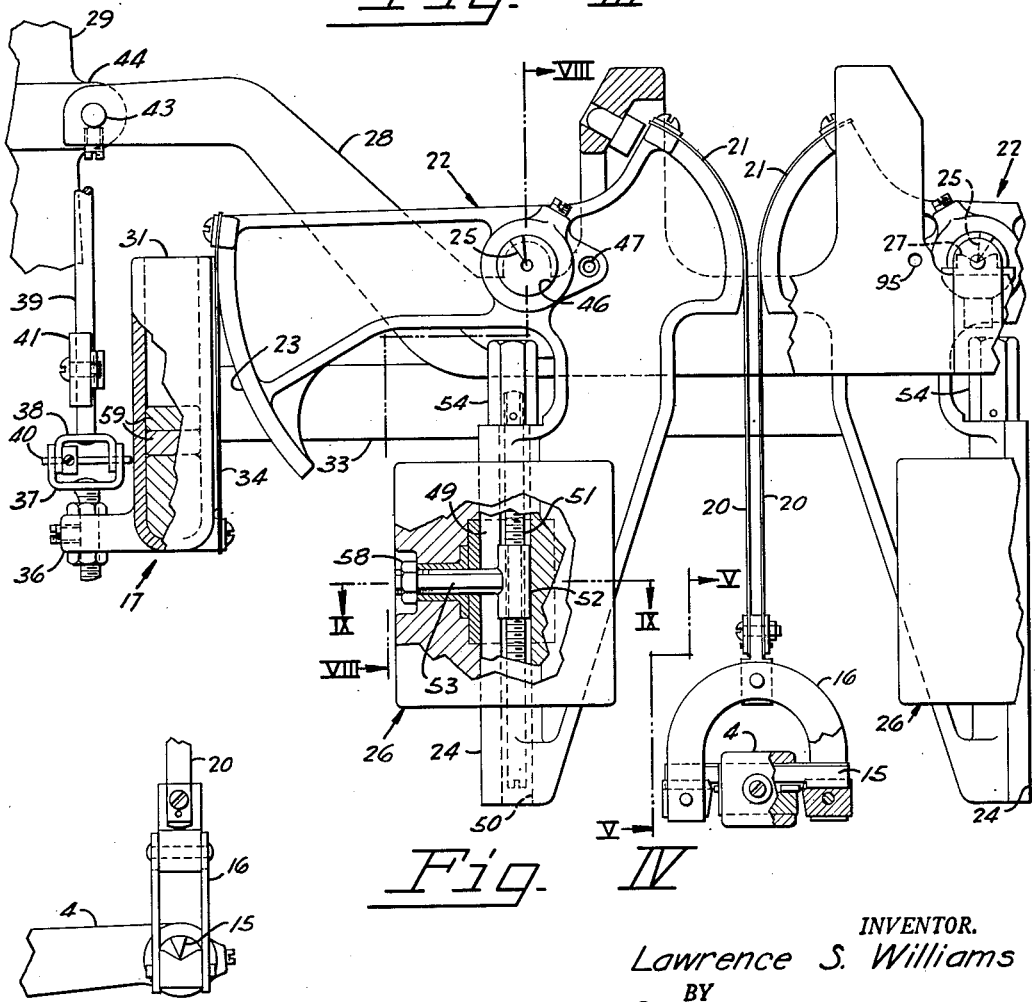
INVENTOR.
Lawrence S. Williams
BY
Marshall and Marshall
ATTORNEYS March 31, 1953  L. S. WILLIAMS  2,633,350
WEIGHING SCALE PENDULUM
Filed Feb. 27, 1947  11 Sheets-Sheet 3
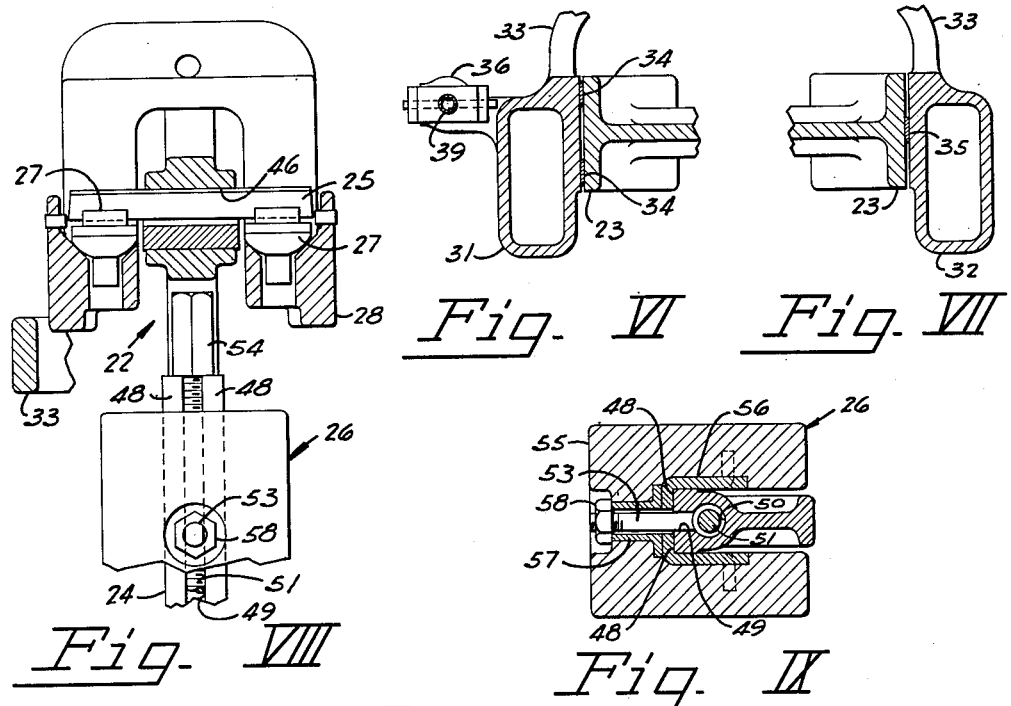
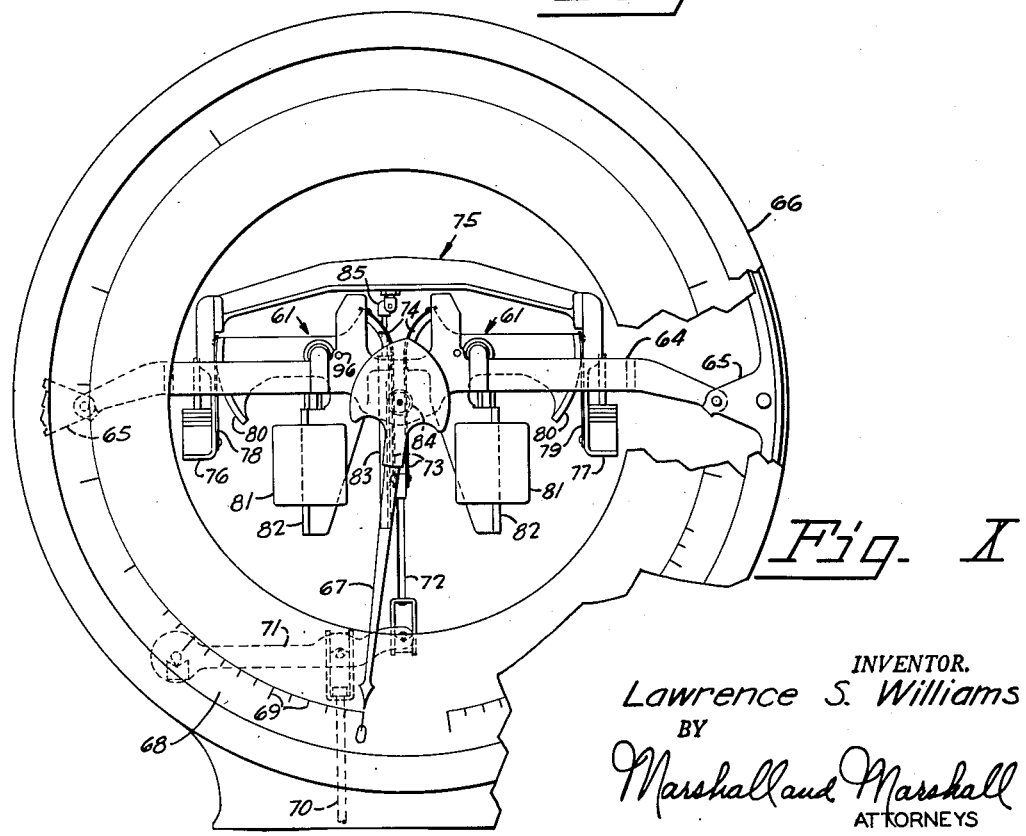
INVENTOR.
Lawrence S. Williams
BY
Marshall and Marshall
ATTORNEYS March 31, 1953      L. S. WILLIAMS      2,633,350
WEIGHING SCALE PENDULUM
Filed Feb. 27, 1947      11 Sheets-Sheet 4
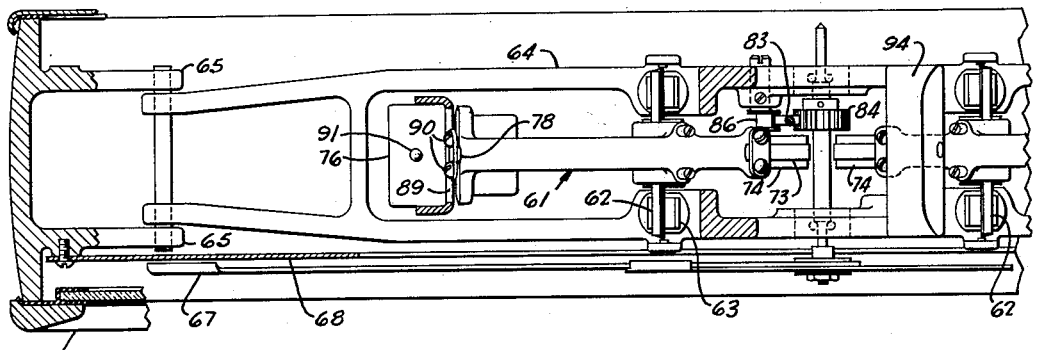
Fig. XII
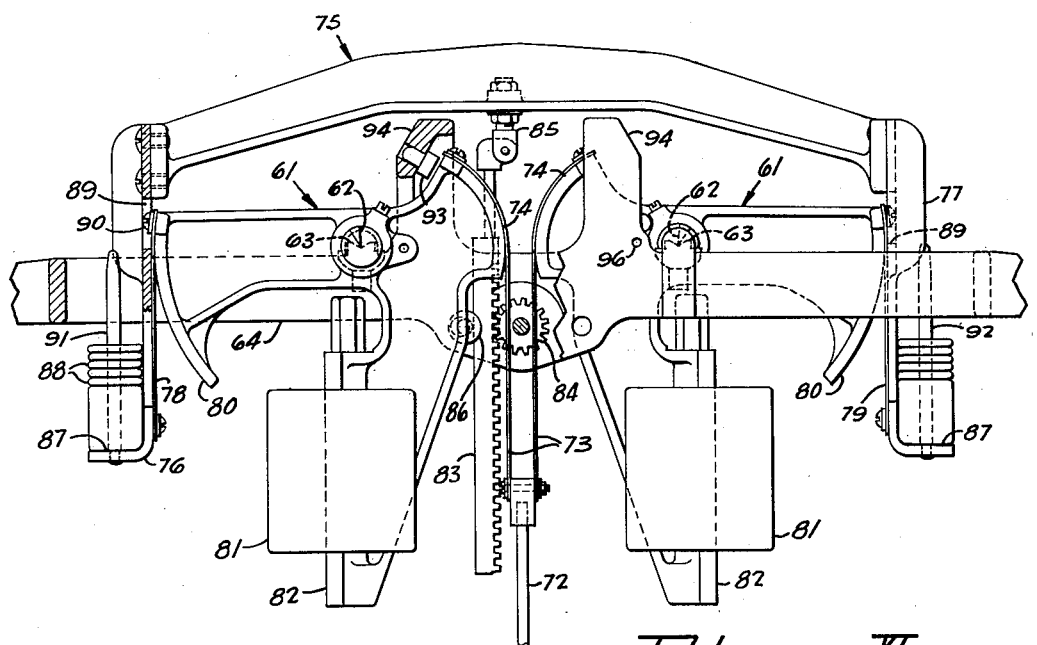
Fig. XI
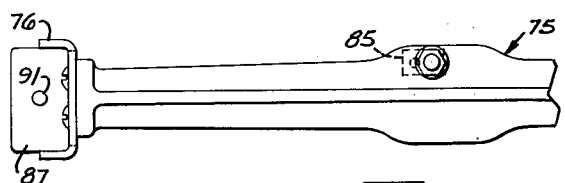
Fig. XIII
INVENTOR.
Lawrence S. Williams
BY
Marshall and Marshall
ATTORNEYS

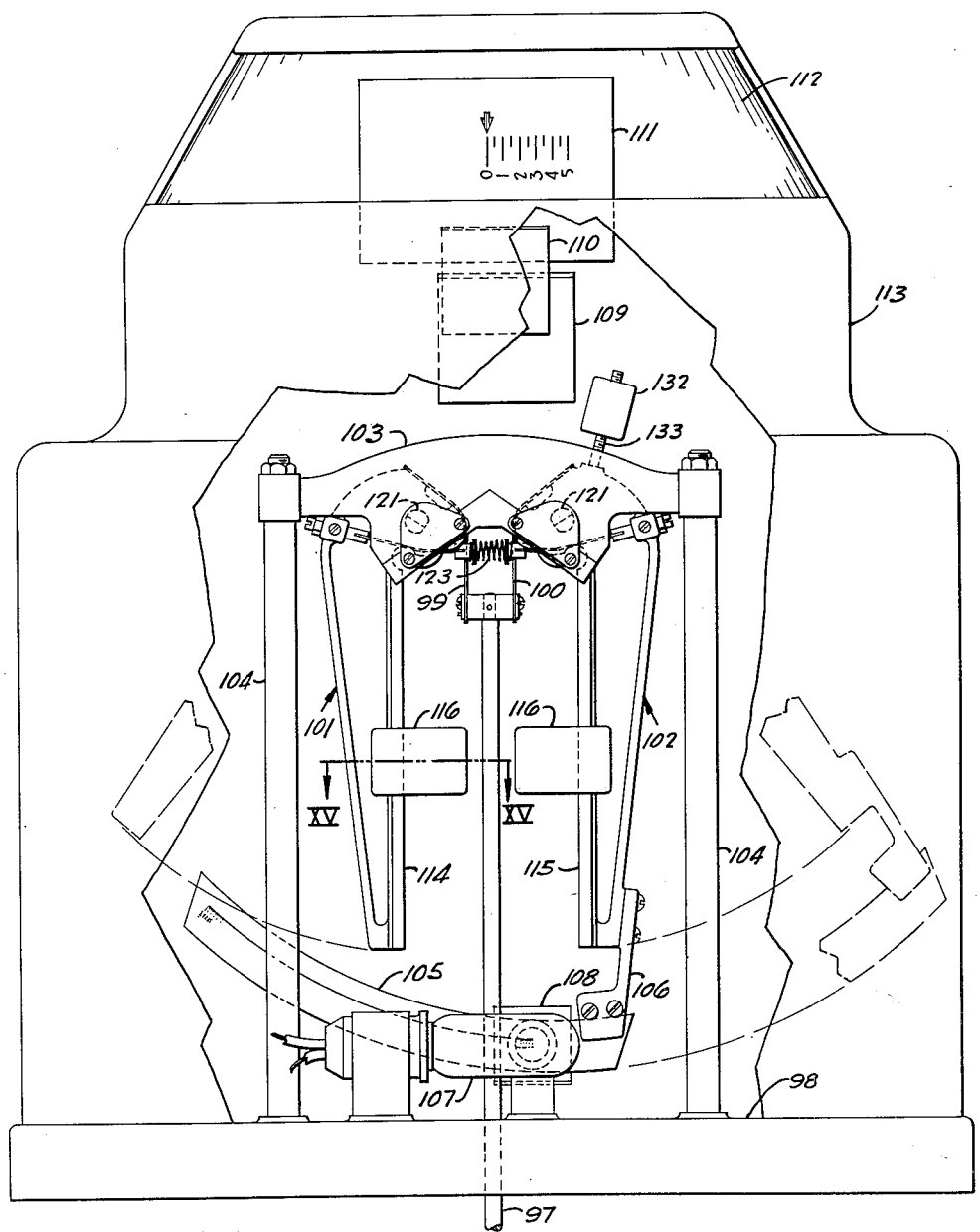
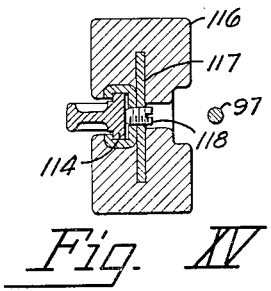
Fig. XIV
Fig. XV

March 31, 1953 — L. S. WILLIAMS — 2,633,350
WEIGHING SCALE PENDULUM
Filed Feb. 27, 1947 — 11 Sheets-Sheet 6
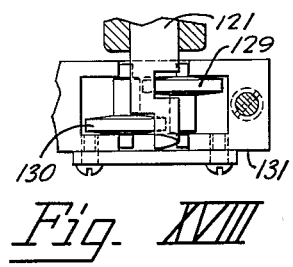
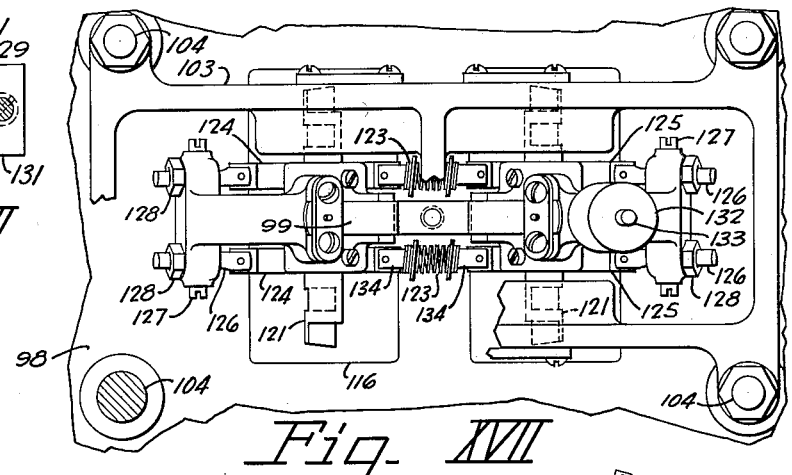
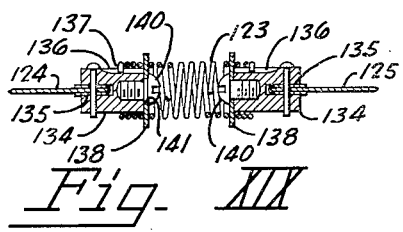
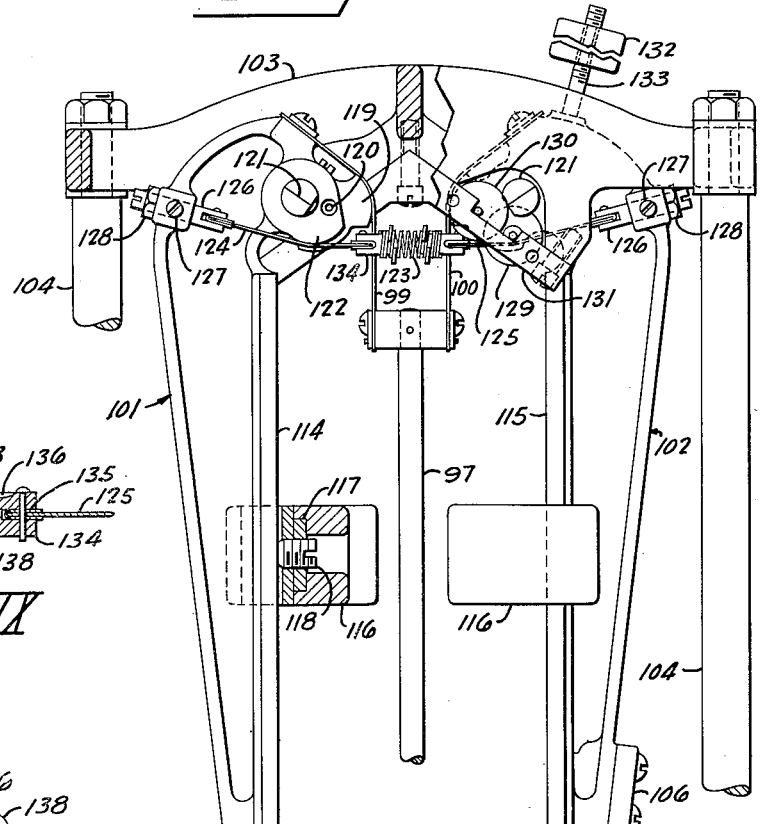
INVENTOR.
Lawrence S. Williams
BY Marshall and Marshall
ATTORNEYS

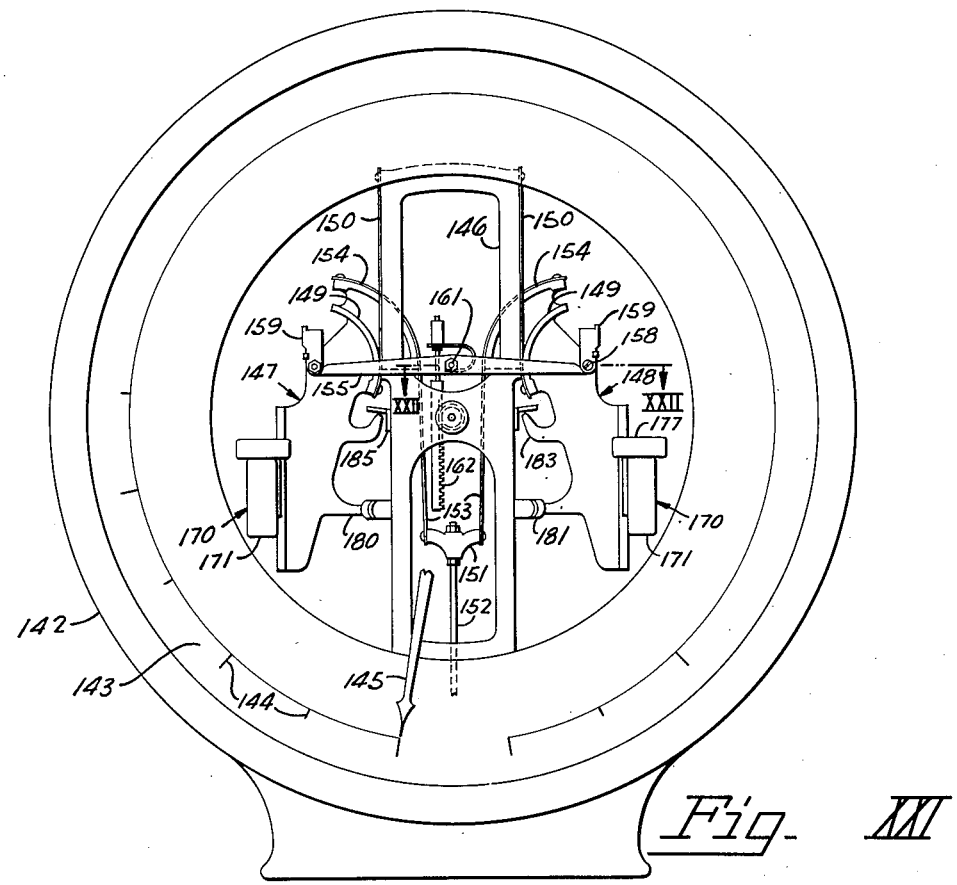

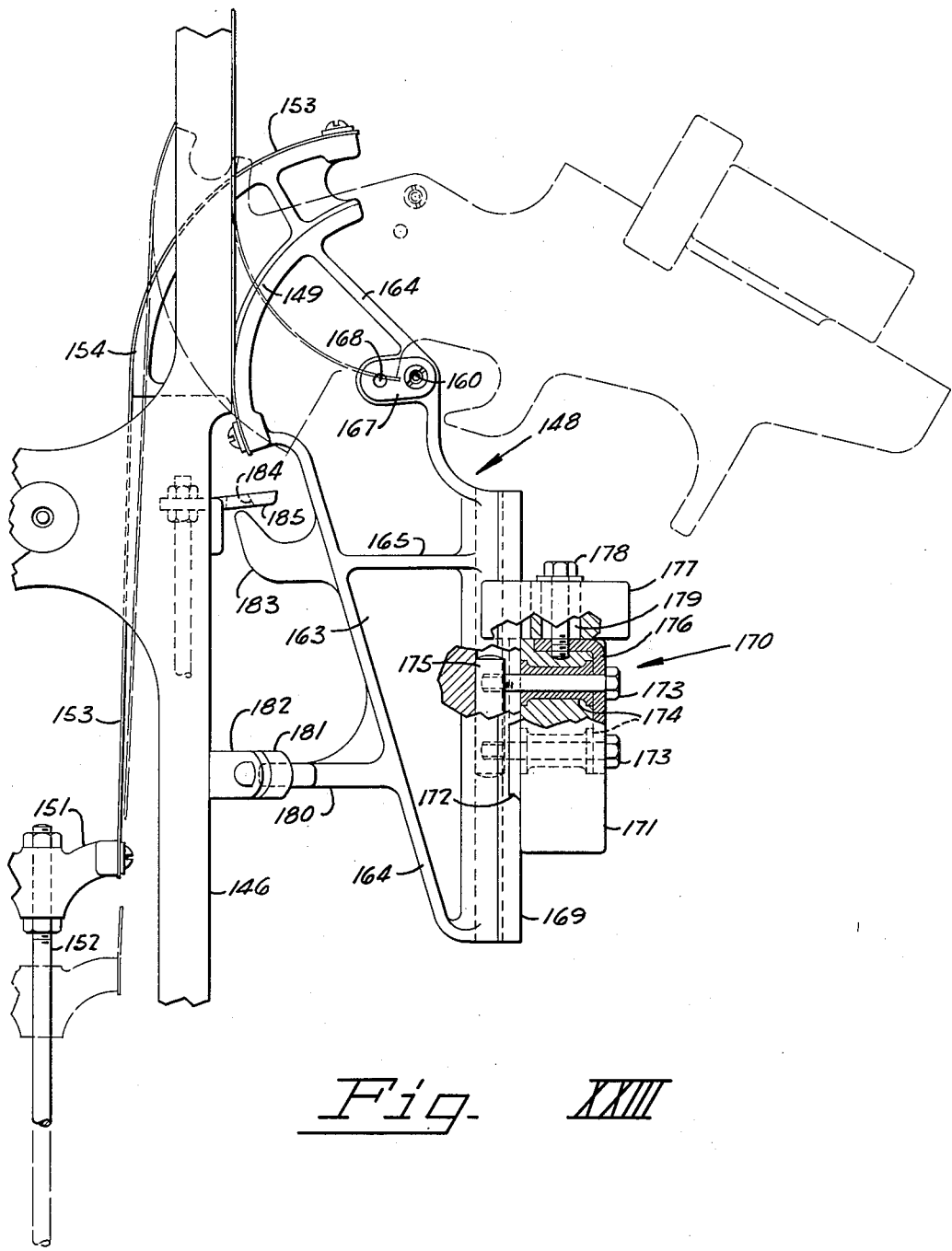
Fig. XXIII

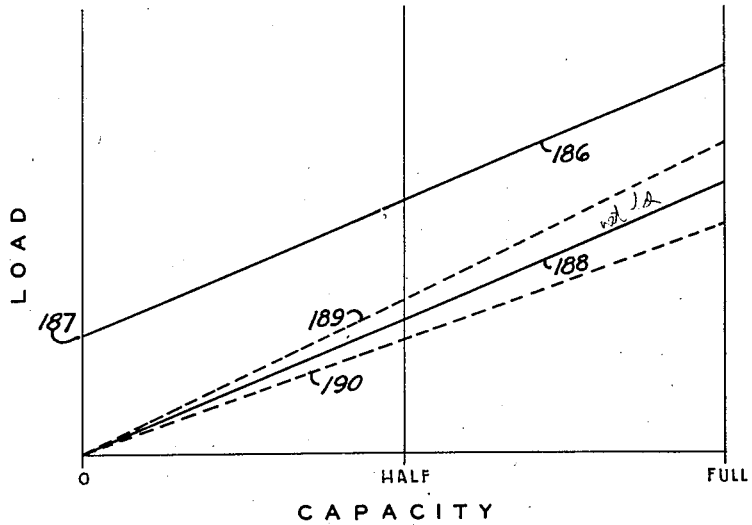
Fig. XXIV
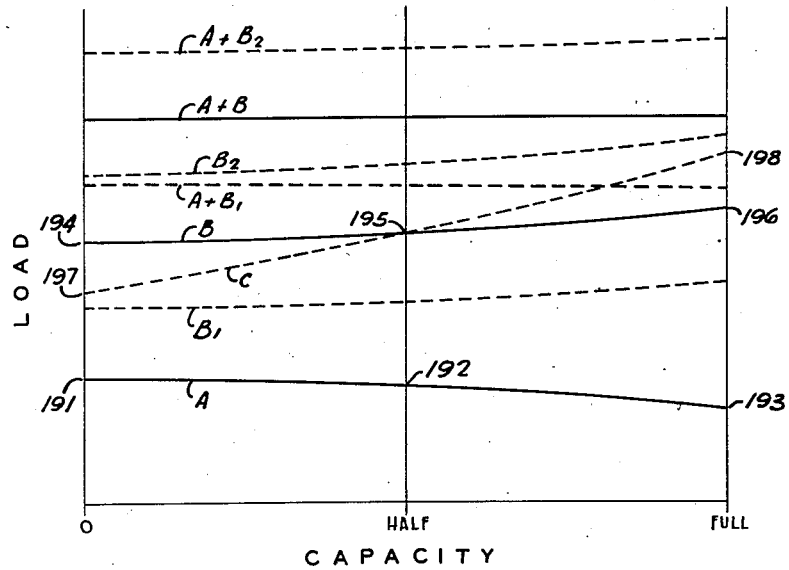
Fig. XXV

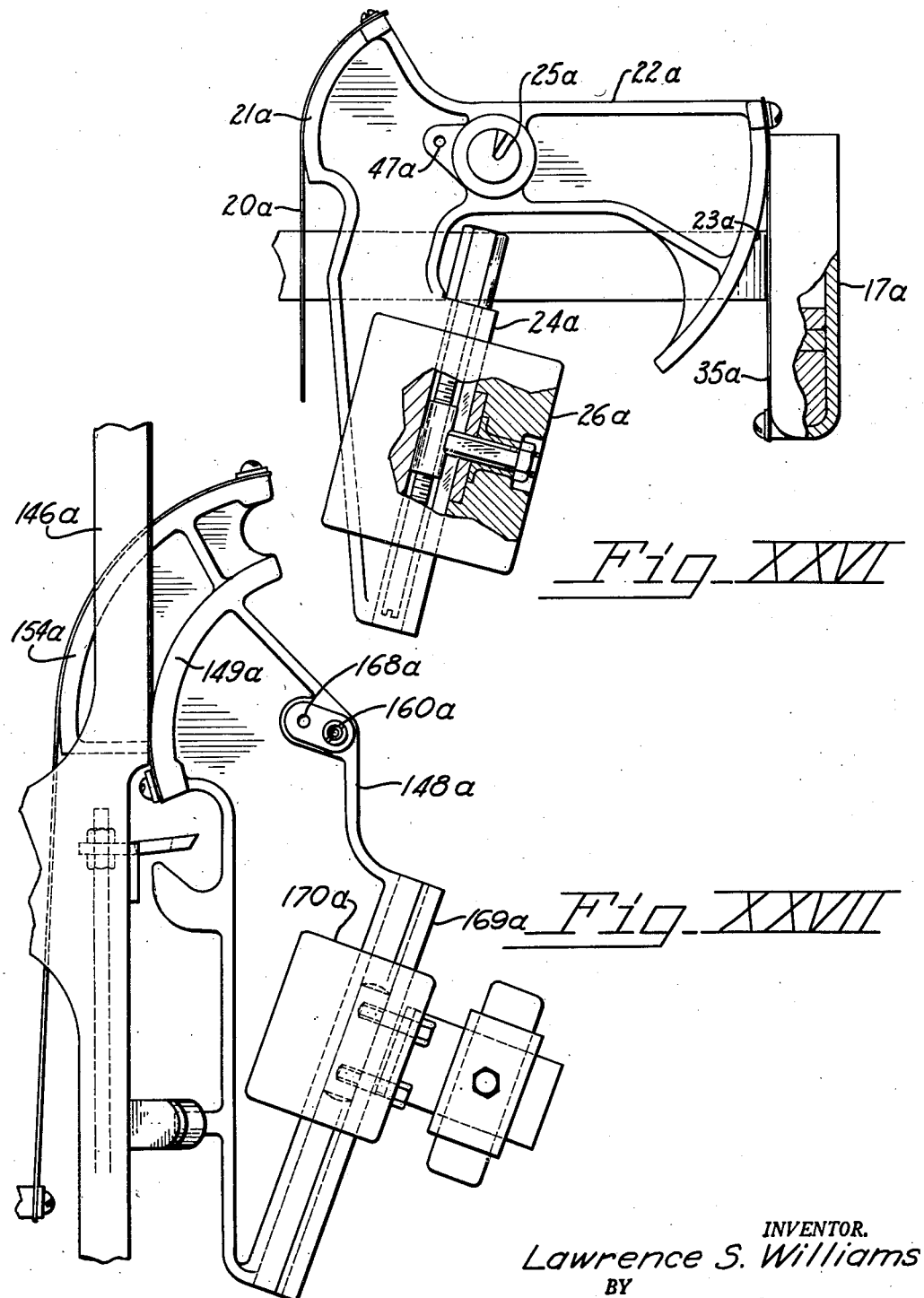

March 31, 1953  L. S. WILLIAMS  2,633,350
WEIGHING SCALE PENDULUM
Filed Feb. 27, 1947  11 Sheets-Sheet 11
*Fig. XXVIII*
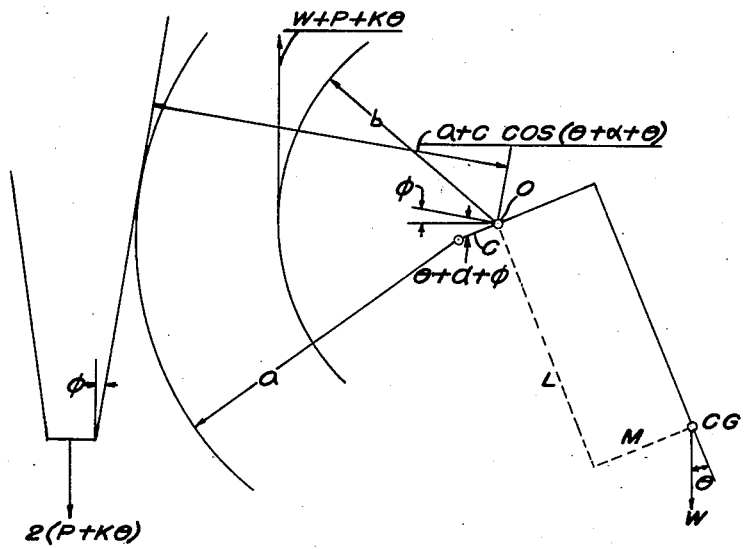
*Fig. XXIX*
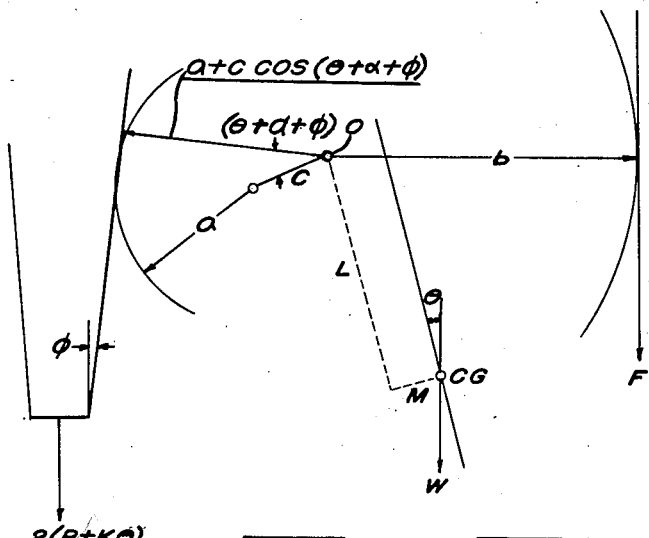
INVENTOR.
LAWRENCE S. WILLIAMS
BY
Marshall, Marshall & Yeasting
ATTORNEYS Patented Mar. 31, 1953

2,633,350

UNITED STATES PATENT OFFICE 2,633,350

WEIGHING SCALE PENDULUM

Lawrence S. Williams, Toledo, Ohio, assignor to Toledo Scale Company, Toledo, Ohio, a corporation of New Jersey Application February 27, 1947, Serial No. 731,284

23 Claims. (Cl. 265—62)

This invention relates to improvements in pendulum counterbalances which are used in automatic weighing scales.

Pendulums have been used as counterbalancing elements for weighing scales and while they are accurate and generally immune to temperature changes, they have nevertheless been expensive to manufacture and difficult to adjust. The principal difficulty encountered in adjusting a pendulum for a weighing scale, in order that the indicator shall move through equal increments of angle for equal increments of load, has been that the known adjustments for varying the load counterbalancing capacity of the pendulum cause errors in linearity, i. e., the half capacity load indication is no longer equal to the average of the zero and full capacity load indications. Every adjustment of capacity therefore required another adjustment to re-establish correct half capacity indication. These adjustments, one to vary the load counterbalancing capacity of the pendulum, the other to secure correct half capacity indication, were inter-related so that no change could be made in either adjustment without requiring a corresponding change in the other adjustment. This made it difficult to adjust a scale because the correct combination of adjustments had to be approached by a succession of adjustments.

This is not too serious a disadvantage when adjusting a small capacity scale because the test loads are small and easily handled. However, for a heavy capacity scale this interdependence of adjustments is serious because of the great amount of labor involved in loading and unloading the scale for each adjustment.

The principal object of this invention is to provide a pendulum counterbalance in which the various adjustments are substantially independent of each other.

Another object of the invention is to provide a pendulum for a pendulum counterbalance which pendulum is extremely rigid and does not include relatively rotatable adjustments.

Another object of the invention is to provide a pendulum counterbalance in which the initial pull is substantially independent of the weighing capacity of the pendulum.

The invention consists in a weighing scale counterbalance including a pendulum having a straight track along which a weight assembly is movable to change the capacity of the pendulum, and a power sector constituting a power arm the effective length of which varies as the pendulum rotates and has substantially a maximum length when the straight track is vertical.

A weighing scale counterbalance embodying the invention, examples of which are illustrated in the accompanying drawings, has the desirable characteristics that the full load indication may be adjusted without affecting the initial pull—the zero net load indication—and without introducing an error in indication at half load. The adjustment to secure correct half capacity indication, although it introduces an error at full capacity, is linearly related to the half capacity error so that an operator may note the error and in one adjustment eliminate it. A further adjustment at full capacity then completes the adjustment of the counterbalance.

The improved counterbalance also satisfies the condition that it supply an appreciable counterbalancing force when it is in its no load or zero position. This counterbalancing force is used to support the effective weight of the lever system and a load receiver.

The improved pendulum counterbalances illustrated in the drawings are the result of the discovery that for any weighing scale pendulum there is a locus or line along which the center of gravity of the pendulum assembly may be adjusted and such an adjustment alters the load counterbalancing capacity of the first and second halves of the weighing range of the pendulum in equal amounts. While it is not necessary that such a locus be vertical when the pendulum stands at zero such a condition is desirable because in that event the initial pull, the force counterbalanced by the pendulum in its zero position, will not be changed by an adjustment of the center of gravity along the locus. In the construction of a pendulum a track consisting of a threaded rod, guide rails, or equivalent mechanical structure is provided to support an adjusting weight and the track is located either along or parallel to the locus. The locus or line along which the center of gravity is adjusted may or may not pass through the turning axis or center of rotation of the pendulum.

These considerations pertain equally well to so-called "fixed center" pendulums and to "floating" pendulums. A fixed center pendulum is one that is supported at its center of rotation. A floating pendulum is one that is supported by flexible members wrapping about cylindrical surfaces concentric with respect to the center of rotation of the pendulum. In the fixed center type of pendulum the locus passes through the axis of rotation unless auxiliary mechanism is employed to apply a predetermined moment to the pendulum. Therefore, the ordinary fixed center pendulum cannot be employed with the locus standing vertical at zero because such a pendulum would afford no initial pull.

In the examples the pendulums are illustrated as equipped with power sectors that are eccentric with respect to the axis of rotation of the pendulums and load force is applied to the pendulums by means of power ribbons overlying the arcuate power sectors. Because of the eccentricity of the power sector the effective power arm, the moment arm at which the load force acts on the pendulum, varies as the pendulum rotates through its travel. As a general rule the locus along which the center of gravity of the pendulum is adjusted stands vertical when the effective power arm is of maximum length. Slight variations from this general rule occur because the pendulum is constructed to distribute the residual error throughout the weighing capacity of the pendulum.

In either a floating pendulum or a fixed center pendulum having concentric sectors to which a predetermined force is tangentially applied the locus along which the center of gravity of the pendulum is adjusted no longer passes through the axis of rotation of the pendulum, but passes that axis on the side opposite the power sector. Therefore such a pendulum can supply sufficient initial pull to carry the weight of a lever system and load receiver even though the locus line is vertical at the zero position.

The predetermined force may be a component of the tension in a fulcrum ribbon supporting a floating pendulum or it may be the tension in a ribbon wrapping on a sector surface of a fixed center pendulum which surface is concentric with the axis of rotation. In this latter case the tension in the flexible member may result from the force of gravity on a suspended mass or it may result from the stress in a spring that is strained by movement of the pendulum.

In the construction of a pendulum according to the invention variations in manufacture are apt to displace the center of gravity of the pendulum including an adjusting weight transversely of the desired locus. Such transverse errors in the location of the center of gravity introduce errors in indication at half capacity. These errors may be corrected either by providing an adjustment for moving the center of gravity transversely of the locus or by changing the magnitude of the predetermined force applied to the concentric sectors of the pendulum.

Referring now to the drawings:

Figure I is a side elevation, with parts broken away, of a cylinder scale incorporating the improved pendulum counter-balancing mechanism.

Figure II is a rear elevation of the weighing scale showing the improved pendulum counterbalance.

Figure III is a plan view taken substantially along the line III—III of Figure II.

Figure IV is an enlarged fragmentary elevation of the improved pendulum counterbalance with parts broken away and other parts shown in section, to show the details of construction.

Figure V is a fragmentary detail taken along the line V—V of Figure IV.

Figure VI is a fragmentary horizontal section taken substantially along the line VI—VI of Figure II.

Figure VII is a fragmentary horizontal section taken substantially along the line VII—VII of Figure II.

Figure VIII is a transverse vertical section taken substantially along the broken line VIII—VIII of Figure IV.

Figure IX is a horizontal section taken along the line IX—IX of Figure IV.

Figure X is a front elevation with parts broken away showing the improved counterbalancing mechanism incorporated in a dial scale.

Figure XI is an enlarged elevation of the counterbalancing mechanism shown in Figure X.

Figure XII is a plan view with parts shown in section of the counterbalancing mechanism shown in Figure XI.

Figure XIII is a fragmentary plan view of the suspended frame.

Figure XIV is a front elevation with parts broken away of a projection weighing scale embodying the invention.

Figure VX is a horizontal section taken along the line XV—XV of Figure XIV.

Figure XVI is an elevation at enlarged scale of the counterbalancing mechanism illustrated in Figure XIV.

Figure XVII is a plan view of the mechanism illustrated in Figures XIV and XVI.

Figure XVIII is a fragmentary plan view of the fulcrum support for the pendulums illustrated in Figure XVI.

Figure XIX is a fragmentary detail of a spring that is used to supply a predetermined force to the pendulum mechanism.

Figure XX is a perspective view of one of the mountings for the spring shown in Figure XIX.

Figure XXI is a front elevation of a dial scale employing a floating pendulum constructed according to the invention.

Figure XXII is an enlarged horizontal section taken substantially along the line XXII—XXII of Figure XXI.

Figure XXIII is an elevation at enlarged scale showing one of the floating pendulums in its zero and full load positions.

Figures XXIV and XXV are line diagrams showing the characteristics of the pendulums and the effect of making certain adjustments.

Figures XXVI and XXVII show modifications of the improved pendulums in which modifications the tracks do not stand vertical at their zero net load position.

Figures XXVIII and XXIX are sketches illustrating the mathematical relations involved in the pendulums.

A cylinder scale embodying the invention is illustrated in Figure I. In this scale forces from loads that are placed on a load receiver 1 are transmitted through a spider 2 to load knife edges 3 of a lever 4. The lever 4 has fulcrum pivots 5 that rest in bearings 6 set into the front corners of a base 7. At the rear of the scale a chart housing 8 that surmounts a column 9 extending upwardly from the base 7 encloses a cylindrical chart 10 that carries indicia that may be read through magnifying lenses 11 mounted in a forwardly directed portion 12 of the circular housing 8. The exact reading points for the chart 10 are defined by threads 13 and 14 that serve as indexes extending parallel to the axis of the chart 10. Forces from loads applied to the load receiver 1 are transmitted through the lever 4 and its power pivot 15 to a stirrup 16 that is connected to load counterbalancing mechanism. A loading frame 17 included in the load counterbalancing mechanism is driven upwardly in proportion to the load being counterbalanced and acts through a rack 18 and pinion 19 to rotate the chart 10 through increments of angle that are proportional to the increments of load applied to the load receiver 1.

Referring to Figure II, in which the pendulum mechanism is shown in its zero load position, the lever 4 acts through its power pivot 15 and stirrup 16 to transmit load forces to a pair of power ribbons 20 that overlie arcuate power sectors 21 of a pair of pendulum bodies 22. The pendulum bodies 22 are identical. Each of the pendulum bodies consists of a rigid casting that in addition to the power sector 21 includes an auxiliary sector 23 and a rectilinear track 24. A knife edge 25 is mounted in each pendulum body 22 with the knife edge substantially at the center of curvature of the auxiliary sector 23. Pendulum weights 26 are mounted on the rectilinear tracks 24.

The pendulum bodies 22 are pivotally mounted with their knife edges 25 resting in bearings 27 that are mounted in an underslung portion of a bridge 28 spanning the space between a pair of uprights 29 and 30 that are erected from the base 7 and extend upwardly within the column 9.

The loading frame 17 constituting a suspended mass in this example consists of a pair of hollow receptacles 31 and 32 that are held in spaced relationship by a connecting bar 33. The loading frame 17 is positioned with the sides of the receptacles 31 and 32 juxtaposed to the auxiliary sectors 23 and is suspended from the pendulum bodies 22 by means of metallic ribbons 34 and 35 that are attached near the bottom of the sides of the receptacles 31 and 32 and extend upwardly along the sides of the receptacles and at their upper ends overlie and are attached to the concentric auxiliary sectors 23 of the pendulum bodies 22. To provide three point support for the purpose of eliminating strain there are two of the ribbons 34 to support the receptacle 31 and one of the ribbons 35 to support the receptacle 32. The juxtaposition of the sides of the receptacles and the sectors limits any swinging movement of the loading frame 17.

The receptacle 31 has a laterally extending lug 36 on which a yoke 37 is adjustably mounted. A smaller yoke 38 secured to the bottom of a rod 39 that carries the rack 18 is pivotally mounted in the first yoke 37 by means of a pin 40. The adjustment of the height of the yoke 37 from the lug 36 permits the chart 10 to be brought to zero indication when the rectilinear tracks 24 of the pendulum bodies 22 are vertical. A balance weight 41 mounted on the lower end of the rod 39 causes the rack 18 to lie against the pinion 19 to avoid backlash between these members.

The bridge 28 (see also Figure III) is mounted on removable studs 42, 43 that are threaded and locked into laterally extending ears 44 of the uprights 29 and 30. The assembly comprising the pendulums 22, the loading frame 17 and the bridge 28 may be removed from the scale as a unit by removing at least some of the studs 42, 43 and lowering the bridge to clear the laterally extending ears and then withdrawing it horizontally. Cut-out portions 45 of the uprights 29 and 30 provide sufficient clearance for the ends of the bridge 28.

Referring to Figure III it will be noticed that the receptacles 31 and 32 are offset from the center line of the pendulum bodies 22 by an amount sufficient to counterbalance the weight of the connecting bar 33 that is offset horizontally far enough to clear the sides of the underslung portion of the bridge 28. The lug 36 extending from the receptacle 31 is also offset from the vertical center line of the pendulum bodies by an amount that is determined by the vertical relationship between the center line of the pendulum bodies and the axis of the chart 10. The offset of this lug permits the rack driving rod 39 and the rack 18 to stand vertical when the scale is level.

Referring to Figure IV which shows the pendulum assembly at an enlarged scale, the relationship between the various parts of the pendulum body 22 is clearly shown. In constructing one of the pendulum bodies 22 the sharp edge of the knife edge 25 which is located at the center of a hole 46 bored through the pendulum body 22 may be used as a reference point. A second reference point is a hole 47 that is located at the center of curvature of the power sector 21. The rectilinear track 24 extends in a downward direction along a line that is substantially perpendicular to a line passed through the knife edge 25 and the center of curvature of the power sector 21. The auxiliary sector 23 is formed as the end of an arm that extends oppositely to the power sector 21. The angular relationship between the track 24 and the line through the centers of curvature of the power sector 21 and the auxiliary sector 23 (the last center being located at the knife edge 25) departs slightly from a right angle by an amount that is related to the increase in divergence between the power ribbons 20 as the pendulums swing in response to a load on the scale. The exact angular relationship is such that if the weight 26 is moved through an arbitrary distance along the track 24, the resulting change in load counterbalancing effect at mid scale will be equal to the average of the changes in load counterbalancing effect resulting at zero and at full scale. In other words, the weight 26 may be moved along the track 24 without introducing any half capacity error in indication. If the track 24 is precisely vertical at zero it is apparent that the weight 26 may be moved along the track without producing any change in zero load counterbalancing capacity because the effective horizontal distance between the center of gravity of the weight and the pivoting point of the pendulum body is not changed. If the pendulum starts from this position the movement of the weight along the track 24 causes precisely twice as much change in indication at full scale as it does at mid scale.

The rectilinear track 24 consists of a pair of parallel rails 48 (Figures VIII and IX) that are separated by a groove 49 terminating in a bored hole 50 that, in effect, forms a T-slot. A threaded rod 51 located in the bored hole 50 engages a cylindrical nut 52 that has a laterally extending stem 53 projecting through the slot 49 between the rails 48. The upper end of the threaded rod 51 is secured in a hexagonal nut 54 that rests against the upper ends of the rails 48. The weight 26 consists of a U-shaped lead casting 55 having a steel U-shaped insert 56 adapted to straddle the rails 48. The weight 26 is mounted on the pendulum body 22 with the laterally extending stem 53 projecting through a hole in the insert 56 and through a compression sleeve 57 and is secured thereto by tightening a nut 58 that clamps the insert 56 tightly against the rails 48. When it is necessary to make an adjustment in the position of the weight the clamping nut 58 is loosened and the threaded rod 51 is rotated to bring the weight to its new location. The nut 58 is then tightened. This construction permits the weight to be moved to a new position and locked there without having the new position disturbed as the locking means is tightened.

The receptacles 31 and 32 forming part of the loading frame 17 are partially filled with lead and additional lead slugs 59 are added to bring the weight of the frame to a particular value. In this pendulum counterbalance mechanism the weight of the loading frame 17 and the initial pull resulting from the dead load of the load receiver 1 plus the weight of the spider 2 and lever 4 are balanced against each other to secure correct half capacity indication. In this particular counterbalancing mechanism it was found that the addition of one ounce to the loading frame 17 and sufficient weight to the load receiver 1 to restore the zero indication causes the mid scale or half capacity indication to decrease about $\frac{1}{16}$ of an ounce less than half the change resulting at full capacity. A movement of the weight 26 to correct the full capacity indication then leaves the half capacity indication approximately $\frac{1}{16}$ of an ounce fast. This relationship provides an easy method of adjusting the scale to secure correct indications.

While the pendulums are shown with the rectilinear tracks 24 standing vertical at zero the composite center of gravity of the pendulum body 22 and the weight 26 is not vertically beneath the pivot 25 but rather is displaced laterally from a vertical line through the pivot in the direction of the auxiliary sector 23. The amount of the displacement is a function of the ratio between the weights of the loading frame 17 and the pendulum bodies 22 including the weights 26.

Referring to Figure II the chart 10 has its shaft carried in standards 60 extending upwardly from the tops of the uprights 29 and 30. The underslung bridge 28 is supported from the tops of the uprights 29 and 30. As a result there is a rigid dimensional stability maintained between the bearings 27 supporting the pendulums and the chart shaft bearings in the standards 60. This dimensional relationship is practically immune to stresses or deflections that may occur in the base 7 or the uprights 29 and 30. The dimensional stability of this path is important because the chart rotation is determined by the difference in distance determined by this path and a second path that includes the pendulum bodies and the rack. For accurate weight indications the difference in dimension between these two paths must be affected only by pendulum motion and not by any other dimensional changes resulting from externally applied forces. The use of the underslung bridge that is supported at the base of the standards 60 provides a much shorter and more rigid assembly than would result if the bearings 25 were carried in a pedestal erected from the center of the base 7 because such a construction would then include the pedestal, the base 7 and the entire length of the upright 29 as part of the structure determining the chart indication.

Another example of the invention is illustrated in Figures X, XI, XII and XIII. In these figures a fixed center pendulum counterbalance mechanism having substantially the same characteristics as those shown in the first example is shown incorporated in a dial scale. In this example a pair of pendulum bodies 61 each provided with a knife edge 62 (Figure XI) are pivotally mounted in bearings 63 mounted in a horizontal bridge 64 that is mounted between lugs 65 extending inwardly from the rim of a substantially watchcase-shaped housing 66. An indicator 67 cooperates with an annular chart 68 bearing indicia 69 to indicate the load being counterbalanced by the pendulum mechanism.

Load forces to be counterbalanced and indicated are transmitted through a steelyard rod 70 and a pendulum lever 71 to a second steelyard rod 72 that is suspended by means of power ribbons 73 from power sectors 74 of the pendulum bodies 61.

A loading frame 75 that includes weight receivers 76 and 77 is suspended by means of ribbons 78, 79 from sectors 80 that are concentric with respect to the knife edges 62. The rotation of the pendulum bodies 61 in response to an increase in load elevates the loading frame 75 through a distance that is exactly proportional to the increase in load. The proportionality between the upward movement of the loading frame 75 and the load is determined by the position of pendulum weights 81 on tracks 82 of the pendulum body 61. The upward movement of the loading frame 75 is transmitted through a rack 83 and pinion 84 to drive the indicator 67. The rack 83 is suspended from a yoke 85 that is adjustably mounted in a flange of the cross member of the loading frame. The pivoting connection between the rack 83 and the yoke 85 is located on the pitch line of the rack and pinion so that small lateral movements of the loading frame that are permitted by the clearance between the surfaces of the weight receivers and the concentric sectors 80 will not produce rotation of the indicator and so that the weight of the rack 83 causes it to lie against the pinion 84 to prevent backlash. An antifriction roller 86 prevents disengagement of the rack from the pinion. The roller 86 normally does not contact the rack except during changes in load when the separating pressure between the rack and the pinion exceeds the force with which the rack tends to lie against the pinion. Referring to Figure XII, it will be seen that the rack 83 and pinion 84 are offset from the center line of the pendulum bodies 61 so that the rack operates at the side of the power sector of one of the pendulum bodies and does not interfere with either the power sector, the power ribbons 73 or the second steelyard rod 72.

Geometrically, the pendulum bodies 61 are substantially the same as the pendulum bodies 22 of the first example. A slight difference, however, exists because the lever system of a dial scale employed to transmit force from a load receiver to the power ribbons does not provide an exactly constant force transmission ratio and the relationship of the power sectors 74 to the remainder of the pendulum bodies 61 must be altered slightly to correct for the non-linearity in the lever system. In the cylinder scale illustrated in the first example the force transmission ratio from the load receiver to the power ribbons is very nearly constant.

The loading frame 75 differs from the loading frame of the first example in that it is formed as an assembly of three pieces. The weight receivers 76 and 77 are steel stampings that provide a vertical surface along which the ribbons 78 and 79 are disposed, a flat shelf-like bottom portion 87 on which weights 88 may be stacked and a shallow channel-shaped upper portion that is attached to the ends of the connecting bar of the frame. Clearance holes 89 are provided to clear mounting screws 90 that clamp the ribbons 78 or 79 to the upper ends of the concentric sectors 80. The weights 88 are perforated so that they may be stacked on pins 91 and 92 that are riveted into the shelf-like portions 87. These weight receivers are more convenient to use than the receptacles 31 and 32 of the loading frame 17 of the first example inasmuch as the weights may be added or removed by merely grasping the weight and lifting it off the pin.

This pendulum mechanism offers the same advantages as far as rigidity of structure is concerned as the mechanism shown in the first example. In fact this second example in this respect is superior to the first because the bearings that journal the indicator shaft are mounted in the bridge 64 intermediate the bearings 63 so that there is no possibility of change in this dimension. In this example, as shown but not specifically described in the first example, the downward movement of the pendulums that drives the indicator past zero is checked by rubber bumpers 93 that are mounted in U-shaped cross-ties 94 extending over the power sector portions of the pendulum bodies 61. The bumpers 93 engage the upper ends of the power sectors 74.

The bridges 28 of the first example and 64 of the second example are provided with holes 95 and 96, respectively, that register with the holes at the centers of the power sectors when the pendulums are rotated slightly below their zero position. When the pendulum counterbalance assemblies are prepared for shipment, rods are inserted through these holes and then the pendulums are rotated outwardly enough to lift the knife edges clear of the bearings. The pendulums are tied in the latter position with packing blocks to prevent further rotative movement.

The pendulum body in each of these two examples consists of a frame having a power sector—the sector 21 or 74, an integrally formed auxiliary sector—the sector 23 or 80, and a rectilinear or straight track that is generally perpendicular to a line passed through the centers of curvature of the sectors, and means for applying a predetermined force to the pendulums— the loading frame 17 or 75. The rectilinear tracks 24 or 82 are oriented with respect to the sectors such that for all positions of the weights 26 or 81 along the tracks the average of the loads counterbalanced by the pendulums in their zero and full capacity positions is equal to the load counterbalanced in their half capacity position.

A third example of pendulum load counterbalancing mechanism incorporating the invention is illustrated in Figures XIV to XX inclusive. In this example springs are used instead of the loading frames for supplying the predetermined force to the pendulum mechanisms. Further, instead of driving an indicator or indicating chart by means of a rack and pinion a projection chart is mounted directly on one of the pendulum bodies and an optical system is employed to give a magnified projected indication.

In this example loads to be counterbalanced and indicated are applied to a steelyard rod 97 that extending upwardly through a clearance hole in a base 98 is suspended from power ribbons 99 and 100 depending from pendulum bodies 101 and 102. The pendulum bodies 101 and 102 are pivotally mounted in a bridge 103 that is supported from the base 98 by heavy upright stud bolts 104. The pendulum bodies 101 and 102 swing outwardly with an increase in load. A projection chart 105 that is mounted in a bracket 106 depending from the lower end of the pendulum body 102 is carried through the optical path of a projection system that includes a light source 107, condensing and projecting lenses mounted on opposite sides of the path of movement of the projection chart 105, mirrors 108, 109 and 110, and a screen 111. The use of the mirrors permits projection of the chart indicia onto the screen 111 without interference from the pendulum structure or its support. The screen 111 is visible through a window 112 forming the upper part of a housing 113 that encloses the pendulum mechanism and the projection system.

The pendulum bodies 101 and 102 are provided with rectilinear T-shaped tracks 114 and 115 on which pendulum weights 116 are adjustably mounted. Referring to Figure XV each of the pendulum weights 116 consists of a lead casting having a sheet metal insert 117. The insert 177 includes a substantially C-shaped clip that partially encircles the T-shaped track 114 and that is clamped to the track by a set screw 118.

Referring to Figures XVI and XVII, each of the pendulum bodies consists of a rigid member that includes the track 114 or 115 and power sector 119 that is concentric about a point 120 displaced from the turning center of the pendulum. The turning center of the pendulum is defined by knife edges formed in a cylindrical member 121 mounted in a bored hole in the pendulum body. An auxiliary sector 122 is formed on the pendulum body and is concentric with respect to the turning center. Because of the relatively small size of the power sector 119, the power ribbon 99 or 100 is passed over the sector and is secured to another portion of the pendulum body.

The predetermined force in this example is supplied by springs 123 that are connected between ribbons 124 and 125 that, after partially wrapping on the concentric sectors 122, are attached to threaded rods 126 adjustably mounted in the pendulum bodies. The threaded rods are kept from rotating by screws 127 and are adjusted lengthwise by nuts 128 threaded onto their outer ends. Adjustment of the threaded rods 126 varies the extension of the springs 123 for a given pendulum position and thereby provides an adjustment somewhat similar to the addition or removal of weight from the loading frames 17 or 75.

In this example, precise positioning of the pendulum is required because the position of the pendulum is read or indicated by the projection chart carried by the pendulum and furthermore a portion of the load counterbalancing force is applied by the springs 123. It is therefore necessary that the turning axis of the pendulum be very precisely positioned and maintained in that position. The uncertainty of positioning of an ordinary knife edge in a V-bearing allows sufficient horizontal motion of the pendulum body 102 independently of load to produce a substantial error in indication. For this reason a knife edge bearing in which the bearing consists of a pair of rollers 129, 130 (see also Figure XVIII) having peripheries intersecting at right angles at the turning axis and a knife edge bar having 90 degree pivots cooperating with each roller is used to provide the turning axis. The members 121 are machined to provide the 90 degree pivots. This construction is substantially the same as two knife edge and flat bearings arranged at 90 degrees to each other since each of the roller surfaces is movable in the direction of rotation of the pivot, the combination affords a very precisely located turning center having extremely low friction. The rollers 129 and 130 constituting each bearing have their axles mounted in a rectangular notch in a bar 131 that is bolted to the undersurface of the bridge 103.

The pendulum bodies 101 and 102 are identical except for the projection chart 105 and its bracket 106 and a balance weight 132 that is mounted on a stem 133 in position to counterbalance the weight of the chart 105 and its bracket 106.

To further facilitate the adjustment of this weighing mechanism the rate of the springs 123 is also made adjustable. For this purpose members 134 joining the spring 123 to the ribbons 124 and 125 are formed so that the number of active coils in the spring may be varied. For this purpose each of the members 134 consist of a cylindrical portion having a slot 135 cut in from one end to accommodate the corresponding ribbon, and having a longitudinal keyway 136 to receive an inturned end 137 of the spring 123 and a washer 138 having a notch 139 cut in one side thereof. The washers 138 are shaped to the helix angle of the spring and the sides of the notch 139 are offset so that when the washers 138 are assembled on the members 134 the spring 123 may be threaded onto the members and located with the end of the spring engaged in the keyway 136 and the spring coils held against the washer 138. Screws 140 holding the washers 138 to the members 134 differ in that one has a shoulder 141 such that that washer is rotatable even though the screw is tightened. In this assembly the number of active coils of the spring 123 included between the washers 138 may be varied by rotating the loose washer 138 while the spring is held from rotating by the keyways 136 of members 134.

In this pendulum assembly movement of the weights 116 along the tracks 114 and 115 provides adjustment of the load counter-balancing capacity of the pendulums. Variation in the tension and the rate of the springs 123 permits adjustment for half capacity errors and for quarter capacity errors. These latter corrections are not mutually independent, but by design the pendulum is brought so close to perfection that the small corrections may be easily made to achieve any desired degree of accuracy.

In this example the pendulum mechanism consists of a member having a power sector—the sector 119, an auxiliary sector that is concentric with respect to the turning axis—the sector 122, a rectilinear track that is substantially perpendicular to a line passed through the center of curvature of the power sector and the turning center and means for applying a predetermined force to the pendulum—the spring 123, the force of which in addition to its change with pendulum rotation is varied in the adjustment of the scale and which retains such predetermined force relations during the operation of the pendulum in counterbalancing unknown loads.

A floating pendulum may be constructed according to the invention to take advantage of the desirable characteristics of constant initial pull and substantially independent adjustment of the linearity of pendulum rotation with respect to load and the actual rotation with respect to load, i. e. the capacity. A weighing scale counterbalance employing floating pendulums is illustrated in Figures XXI to XXIII inclusive. This counterbalance is contained within a substantially watchcase-shaped housing 142 having a dial 143 on which are suitably inscribed a series of indicia 144 indicating increments of weight. An indicator 145 rotatable in response to loads being weighed sweeps over the dial 143 and cooperates with indicia 144 to indicate the magnitude of the load.

A sector guide 146, a framework consisting of four vertical members held in spaced rectangular relationship by integrally formed cross ties, is mounted in a vertical position within the housing 142. The indicator 145 is carried on a shaft that is journaled in bearings mounted in centrally located cross webs of the sector guide 146.

A pair of pendulums 147 and 148, which embody the invention and each of which has fulcrum sectors 149, are suspended on the sides of the sector guide 146 by means of fulcrum ribbons 150 the upper ends of which are attached to the sector guide 146 and the lower ends of which are attached to the lowermost ends of the fulcrum sectors 149. The fulcrum sectors 149 correspond in function to the fulcrum pivots of an ordinary lever or fixed center pendulum, and the point of tangency, i. e. the take-off point of the fulcrum ribbons 150 from the sectors 149, forms the instantaneous center or fulcrum about which the pendulum pivots although its actual center of rotation is the center of the fulcrum sector.

Forces from loads to be weighed are transmitted through a yoke 151 attached to the upper end of a steelyard rod 152 to a pair of power ribbons 153 whose upper ends overlie the peripheries of and are attached to the upper ends of power sectors 154 of the pendulums 147 and 148. The power sectors 154 are of greater radius than the fulcrum sectors 149 and extended between the sides of the sector guide 146 so that when load is added the pendulums tend to swing outwardly and to roll upwardly along the sides of the sector guide 146. The motion of the pendulums is thus a combination of rotation and translation which may be resolved into a rotation about axes passed through the centers of the fulcrum sectors 149 and an upward translation of these axes. This translation of the pendulum is used as a measure of the load. A pair of compensating bars 155 and 156 are carried on screws 157 and 158 that are threaded through the legs of a yoke 159 and the conical tips of which engage ball bearings 160 mounted in the turning centers of the pendulums 147 and 148. Midway between their ends the compensating bars 155 and 156 carry a loosely pivoted cross bar 161 from which cross bar a rack 162 is resiliently suspended. The rack 162 meshes with a pinion on the indicator shaft and serves to rotate the indicator 145 through an angle that is proportional to the upward translation of the turning centers of the pendulums 147 and 148. Because the rack is suspended from the midpoints of the compensating bars 155 and 156 its motion is the average of the upward translations of the pendulums. The pendulums rotate in opposite directions so that any sidewise tipping of the scale which causes one pendulum to increase its pull causes an equal loss of pull of the other pendulum with the result that the total pull, the position of the rack and the indication remain unchanged.

Each of the pendulums 147 and 148 is formed from a generally flat casting having a thin web 163 (Figures XXII and XXIII), reinforcing ribs 164 around the periphery and a cross rib 165. The casting has laterally extending bosses 166 and 167 along its turning axis to provide support for the bearings 160 carrying the compensating bars 155 and 156. The fulcrum sectors 149 are formed as laterally extending cylindrical wall-like sections concentric with respect to the turning axis. The power sector 154 is formed by an arcuate rib at the upper end of the pendulum casting. The surfaces of the sectors over which the fulcrum and power ribbons lie are circular arcs, the fulcrum sectors being concentric with the bearings 160, while the power sectors are concentric with respect to a point 168 that is displaced from the turning axis, the power sectors consequently being eccentric to such turning axis through the bearings 160.

Each of the pendulums has a straight track 169 formed along one of its edges, which track provides a pair of parallel rails for mounting a weight assembly 170. The track 169 is similar to a T-slot except that the bottom of the slot is cylindrical instead of being rectangular as in the ordinary T-slot. Each weight assembly 170 has a weight 171, one surface of which is machined and provided with flanges 172 forming a groove to receive the track 169. The weight 171, which is cast of lead or some heavy material, is secured in position by a pair of bolts 173 that passing through spools 174 enter the slot in the track 169 and are threaded into a cylindrical nut 175 that is slidable along the cylindrical bottom of the T-slot. Thus the pair of parallel rails constituting the track 169 partially embrace the member to which the weight 171 is attached. The spools 174 are cast in the weight 171 so that the bolts 173 may be tightened without deforming the weight.

An L-shaped insert 176 that is cast into the weight 171 overlies the ends of the spools 174 and has its upper end positioned horizontally and coplanar with the upper end of the weight 171. An auxiliary weight 177 that is generally U-shaped in plan straddles the track 169 and rests against the upper surface of the weight 171. A bolt 178 passes through a slot 179 in the U-shaped weight 177 and is threaded into the upper portion of the L-shaped insert 176. The slot 179 permits the U-shaped weight 177 to be adjustably positioned in a direction generally transverse to the track 169. The actual locus or direction of movement of the U-shaped weight 177 is not critical in that its function is to permit the center of gravity of the pendulum assembly including the weights to be brought onto the correct locus and thus secure a half capacity indication that is the average of the zero and full capacity indications. Adjustment of the entire assembly along the track 169 is then used to secure correct full capacity indication.

The solid lines of Figure XXIII show the pendulum 148 in the position which it occupies when the indicator is at zero, i. e. with no load on the weighing scale load receiver. In this position the track 169 is vertical and the line containing the centers of the fulcrum and power sectors is substantially horizontal. In this position a horizontal flange 180 formed integrally with the pendulum is just clear from arresting bumpers 181 projecting from a bracket 182 mounted on the sector guide 146 and a locking horn 183 has its tip immediately below an opening 184 of a locking bar 185. The locking bar 185 is mounted for vertical movement in the sector guide 146 and is drawn downwardly when the lever mechanism of the scale is locked.

The casting for the pendulum illustrated in Figure XXIII is made of aluminum and the weight is distributed so that the center of gravity of the pendulum casting and the weight assembly 170 lies somewhere along the track 169. The location of the track 169 is fixed according to the geometry of the sectors and the angle at which the power ribbon 153 pulls against the power sector 154 so that the linear relationship between pull in the steelyard rod 152 and angular rotation of the pendulum is maintained for any position of the weight assembly 170 along the track 169. The weight 177 allows adjustment of the linearity of indication to be made after the weight assembly 170 has been clamped to the track 169.

This pendulum offers the advantages that the capacity of the pendulum, viz, the difference between its pull at full capacity and at zero, may be adjusted through wide ranges by movement of the weight assembly 170 along the track 169 without changing the initial pull. This permits, for example, a hundred pound capacity scale to be changed to a two hundred pound capacity scale by merely lowering the weight assemblies 170 along the tracks 169. The capacity of the pendulum can be varied over a useful range of approximately 3:1 by changing the location of the weight assembly 170 along the track 169.

It is not necessary that the track 169 be vertical in the zero position of the pendulum. This condition gives an initial pull that may be higher than that required for a particular weighing scale. In that event the pendulum may be modified by extending the sectors downwardly and shortening the flange 180 so that in its zero position the lower end of the pendulum track 169 is located much closer to the sector guide 146. This modification of the pendulum or pendulums may apply to either the fixed center pendulums shown in Figures I to XX or to the floating pendulums shown in Figures XXI, XXII and XXIII. If the fixed center pendulum, such as the pendulum shown in Figures II and IV, is so modified a construction similar to that shown in Figure XXVI results. In this modification a pendulum body 22a is supported from a knife edge 25a the sharp edge of which constitutes the turning axis of the pendulum. Load forces applied through a load or power ribbon 20a are tangentially applied to a power sector 21a which has its center at a point 47a that is located eccentrically with respect to the turning axis of the pendulum. The load forces are in part counterbalanced by a pendulum weight 26a that is clamped to a track 24a of the pendulum 22a, and in part by the weight of a loading frame 17a that is suspended by means of ribbons 35a from a pendulum sector 23a that is concentric with respect to the turning axis of the pendulum body 22a. In this pendulum the track 24a extends in a direction that is nearly perpendicular to a line passed through the turning axis of the pendulum and the point 47a at the center of the power sector 21a. The power arm of this pendulum, which power arm is generally equal to the perpendicular distance between the straight portion of the load ribbon 20a and the turning center of the pendulum, reaches a maximum value when the line through the turning axis of the pendulum and the power sector center 47a is perpendicular to the load ribbon 20a. At this position the track 24a stands vertical.

This pendulum has lower initial pull than the pendulum shown in Figures II to XX since in its zero net load position a portion of the weight of the loading frame 17a is employed in counterbalancing a portion of the weight of the pendulum body and pendulum weight 26a. This construction has the advantage that low initial pulls may be accommodated and that the load counterbalancing capacity of the pendulum may be changed through wide ranges, without introducing any error in linearity of response, merely by moving the pendulum weight 26a along the track 24a. However it has the disadvantage that any change in counterbalancing capacity of the pendulum affects the pull exerted in its zero net load position.

In like manner the pendulums shown in Figures XXI, XXII and XXIII may be modified as shown in Figure XXVII by providing a pendulum body 148a with fulcrum sectors 149a and a power sector 154a so that these sectors may cooperate with a sector guide 146a even though the pendulum moves to a position much below the zero load position shown in Figure XXIII. In this pendulum 148a a weight supporting track 169a is located along a line that is generally perpendicular to a line passed through the center 160a of the fulcrum sectors 149a and the center 168a of the power sector 154a. The center 160a is the turning axis of the pendulum. A pendulum weight 170a is mounted on the track 169a and by its position along such track determines the load counterbalancing capacity of the pendulum.

In this pendulum, as in the others, the weight supporting track 169a stands vertical or nearly so when the mechanical advantage of the load forces acting on the power sector 154a to rotate the pendulum is a maximum. This condition, that the track is vertical when the mechanical advantage of the load is a maximum, must be satisfied if the linearity of the load counterbalancing characteristic of the pendulum is to remain unaltered as the capacity of the pendulum is adjusted by movement of the pendulum weight along the track.

In each of these modified pendulums the capacity may be varied as desired but every change in capacity requires a corresponding change in the initial pull applied to the pendulum. The change is in a direction that an increase (or decrease) in the capacity of the pendulum requires a corresponding decrease (or increase) in the initial pull in order that the zero load indication shall be maintained. With the exception of this change in initial pull these pendulums have the same characteristics as those previously described.

An ideal pendulum for a weighing mechanism is one that rotates through precisely equal angles for equal increments of load. The motion of such a pendulum may be magnified by optical projection or by rack and pinion to provide suitable indications of load. In the manufacture and adjustment of weighing scales the ideal pendulum has other characteristics. One of these is that its capacity may be varied by one adjustment and that as the capacity is varied the variation occurs proportionately throughout the weighing range.

Figure XXIV shows in graphical form the performance of an ideal pendulum. A line 186 that intersects the load axis at a point 187 indicates the total load counterbalanced by the pendulum as a function of the angular position of the pendulum as measured from its position when the track is vertical. The net load counterbalancing capacity of the pendulum is indicated by a line 188 that passes through the origin of co-ordinates, i. e., shows zero load at zero angle. The power sector eccentricity and size are selected so that the line 188 is straight and the net load counterbalanced at the half capacity or half travel pendulum position is equal to half the net load counterbalanced at the full capacity pendulum position for all positions of the weight on the track. In the pendulums shown in the examples, movement of a weight downwardly (or upwardly) along the rectilinear track has the effect of increasing (decreasing) the slope of the line 188 to a line 189 (190) without changing its zero intercept or introducing any curvature into the line. The ideal pendulum, in addition, provides for counterbalancing an initial pull in addition to its net load counterbalancing effect. If the pendulum is ideal the initial pull component is constant throughout the pendulum travel, i. e., the lines 186 and 188 are precisely parallel regardless of their separation.

In the examples the pendulums are shown in their zero load positions and the initial pull, the distance between the lines 186 and 188, is provided in part by the loading frames 17 or 75, the springs 123, or in the floating pendulum by the radius of the fulcrum sectors 149, and in part by offsetting the center of gravity of the pendulum bodies (including the weights 26, 81, 116 or 170) from a line passed through the turning center of the pendulum parallel to the rectilinear tracks, the offset being in a direction away from the power sectors of the pendulums.

The path or locus of the composite center of gravity of a pendulum body and the pendulum weight as the weight is moved along the rectilinear track is a line parallel to the track. The shift in the position of that line to offset part of the initial pull may be called a "locus shift." To adjust the pendulum so that the spread between the lines 186 and 188 is constant requires a precise proportioning between the predetermined force applied either by the loading frames (or springs) or the component corresponding to the radius of the fulcrum sectors and the transverse shift of the locus of the center of gravity of the pendulum body. The relationship between these factors affecting pendulum performance in so far as initial pull is concerned is illustrated in Figure XXV. In this figure the load counterbalancing effect at various pendulum positions resulting solely from the shift of the locus of the center of gravity is indicated by a line A that intersects the zero axis at a point 191 and that intersects the half capacity ordinate at a point 192 and the full capacity ordinate at a point 193. This is not a straight line and the loads counterbalanced by this component in the half capacity and full capacity positions of the pendulums are less than the load counterbalanced in the zero degree position.

This follows because the change in counterbalancing moment applied to the pendulum body varies according to the product of the shift in the position of the center of gravity transversely to the track from a line through the turning axis and the cosine of the angle through which the pendulum has rotated. The change in counterbalancing moment is therefore proportional to the cosine of the angle. The load acts on the pendulum through a power arm that is determined by the eccentricity of the power sector with respect to the turning center of the pendulum. While the power arm decreases as the pendulum rotates away from zero, the rate of decrease in power arm is not as great proportionally as the cosine of the angle of pendulum rotation. Therefore, the initial pull contributed by offsetting the center of gravity of the pendulum transversely to the track decreases as the pendulum approaches its full capacity position. The line A in Figure XXV illustrates this effect by intercepting the half capacity and the full capacity ordinates at progressively lower values of load.

The initial pull contributed by the predetermined force applied to the auxiliary sectors by the loading frames 17 or 75 or the component of tension in the fulcrum ribbon and the radius of the fulcrum sector is indicated by a line B of Figure XXV that intersects the zero angle ordinate at a point 194 and intersects the half capacity and full capacity ordinates at points 195 and 196 that indicate greater loads than the point 194. The load counterbalanced by this component increases as the pendulum approaches full capacity position because the loading frame (or weight of the pendulum body) acts on a constant moment arm—the radius of the concentric sectors (or fulcrum sector)—while the load acts on a decreasing moment arm—the moment arm afforded by the eccentric power sector. By suitably dividing the initial pull between the loading frame (or fulcrum sector) and the offset of the locus of the center of gravity of the pendulum, the upward curvature of the line B may be used to compensate the downward trend of the line A so that the sum of these two lines—the initial pull—is constant throughout the weighing range as represented by the straight line $A+B$.

If the weight of the loading frame 17 or 75 is reduced without a corresponding change in the center of gravity of the pendulum the load counterbalanced by the loading frame may be represented by the line $B_1$, the ordinates of which are proportional to but less than the ordinates of the line B. This follows because the proportionality between the weight of the loading frame and the portion of the load counterbalanced by the frame remains constant. The initial pull provided by the shift in the center of gravity of the pendulum assembly and the lightened loading frame is indicated by the line $A+B_1$ which, because of the predominance of the line A tends to decrease as the pendulum approaches full load position. If, after the loading frame is lightened by removing weight, the pendulum weights are moved to restore the full load counterbalancing capacity it will be found that the load counterbalanced at half capacity is slightly greater than the indicated amount, i. e., the scale is slow at half capacity. If, on the other hand, the weight of the loading frame is increased the initial pull contributed by the loading frame is increased and the total initial pull (as represented by the line $A+B_2$ which curves upwardly as full load position of the pendulum is approached) causes the scale to counterbalance less load or to indicate fast at half capacity.

Thus, the combination of a loading frame the weight of which is adjustable and a shift of the locus of the center of gravity of the pendulum away from a line parallel to the locus and passing through the turning center of the pendulum provides means for offsetting initial pull without otherwise affecting the performance of the pendulum. In other words, if a pendulum is constructed so that without the loading frames and with the center of gravity located on a line parallel to the rectilinear tracks and passing through the turning center its performance is characterized by the line 188 of Figure XXIV the addition of the loading frame and the shift in the center of gravity provide an additional load counterbalancing force that is constant throughout the operating range of the pendulum. Since the total load counterbalanced by the pendulum is the sum of the two effects the result is a pendulum that may be designed for any reasonable initial pull and capacity without sacrificing any of its other desirable characteristics.

Referring to the third example, a spring is employed to provide the predetermined force. If the spring were of infinite length its rate would be substantially zero and the spring would be functionally equivalent to the loading frames 17 or 75. However, it is impossible to employ an infinitely long spring or even a long spring in the space available in the pendulum mechanism shown in Figures XIV and XVI. The rate of the spring has the effect of increasing the force applied to the pendulum as the pendulum swings through its operating range. This is equivalent to decreasing the weight of the loading frame as the pendulum approaches zero or of increasing the weight as the pendulum approaches full capacity. Referring to Figure XXV the load counterbalanced by the spring is represented by a line C that intersects the zero ordinate at a point 197, passes through the point 195 and intersects the full capacity ordinate at a point 198. The line C, has a curvature somewhat similar to but greater than that of the line B. The load represented by the line C may be divided into two components one of which is proportional to pendulum position and the other of which varies similarly to the load counterbalanced by the loading frames. Since the first component corresponds precisely to the effect of the pendulum weights 26, 81 or 116 that effect may be disregarded in determining the resultant pendulum characteristics. The other effect, present because the line C has greater curvature than the line B, requires that the distribution of initial pull counterbalancing force between the spring and the shift in the locus of the center of gravity of the pendulum be varied by decreasing the proportion counterbalanced by the spring as compared to the proportion counterbalanced by the loading frame. The same compensation may be effected by increasing the shift of the locus of the center of gravity of the pendulum. Thus, so far, the substitution of the springs 123 for the loading frames has merely required that the pendulum weights be mounted somewhat higher on the tracks and that the ratio of the load counterbalanced by the predetermined force be somewhat less than when the loading frames provided the predetermined force.

The substitution of the spring 123 for the loading frame produces one more result in that the curvature of the line C between the zero and the half capacity ordinates is less than the corresponding curvature of the line B and the curvature between the half capacity and full capacity ordinates is somewhat greater than the corresponding portion of the line B. This means that when the components are proportioned to secure correct weighing in the zero, half and full positions, that the scale may indicate slow at the first quarter and fast at the third quarter. Since the spread between the lines B and C of Figure XXV is proportional to the spring rate it follows that the indications at the quarters may be affected by changing the spring rate. In practice this pendulum mechanism is designed so that the spring rate may be varied plus or minus from an initial value and the other portions of the mechanism are designed to give correct weighing for an average spring rate. After the scale is assembled the pendulum weights 116 are set to give approximately correct full scale indication. Then the tension in the spring is adjusted by means of the nuts 128 on the threaded rods until the scale indicates correctly at zero, at half and at full capacity. If there is an error at the quarters in which the errors are of opposite sign the spring rate of the spring 123 is varied by rotation of the loose washer 138 and the half capacity indication is restored by readjustment of the tension in the spring. These adjustments may be carried out until the indications at zero, one quarter, half, three-quarters and full capacity are proportional to the load. At this stage in the adjusting process the weighing capacity of the scale may not be correct but it may be brought to its correct value by adjustment of the weights 116 along the tracks 114 and 115 which adjustment does not upset the adjustment of the spring.

The floating pendulum shown in Figures XXI to XXIII inclusive exhibits the same characteristics as far as adjustment is concerned. Movement of the weight 170 along the track 169 varies the slope of the line 188 of Figure XXIV without introducing any curvature and without changing the pull at zero.

The half capacity correction is made by shifting the locus of the center of gravity of the pendulum assembly transversely to the track. This is the only adjustment available because the radius of the fulcrum sectors and the weight of the pendulum are fixed by other considerations. Shifting the locus has the effect of raising or lowering the line A of Figure XXV. The force or load represented by the line B remains the same. Therefore the sum of the two effects represented by the line $A+B$ is straight or curved, depending upon the relative magnitudes of the two forces. The auxiliary weight 177 permits the locus to be easily adjusted.

The two methods for adjusting half capacity indications may be combined in the fixed center pendulums by providing an adjustment for locus shift as well as changing the magnitude of the predetermined force. This combination of adjustments permits the half capacity error to be corrected without changing the initial pull.

In each of the embodiments illustrated in the drawings the capacity of the pendulum—the difference in the pull exerted on the load ribbons at the zero load position and at the full load position—may be adjusted by moving a weight along a track and such adjustment does not introduce any non-linear error into the pendulum. In other words if a graph of load force versus pendulum rotation is a straight line for one position of the weight along the track it will be a straight line for any other position of the weight along the track. Since the movement of the weight along the track effects only a change in capacity or at most a change in capacity and a change in pull at zero load indication it follows that this adjustment of the pendulum is completely independent of the "straight line" adjustment of the pendulum.

In these pendulums the straight line correction, the correction to secure correct half capacity indication, is made by adjustment of the center of gravity of the pendulum assembly in a direction perpendicular to the track along which the capacity adjusting weight is moved or by varying the balance between the dead load pull applied to the pendulum and a moment applied either by a spring or by the force of gravity acting at a constant moment arm to produce rotation of the pendulum. These adjustments for straight line produce a change in capacity of the pendulum and therefore in the ordinary balancing procedure are made first so that the capacity adjustment completes the adjustment of the scale.

Pendulums constructed according to the invention have the feature that a single adjustment is effective to change the ratio between load and pendulum rotation without disturbing the linearity of such relation.

This novel concept is embodied in each of the pendulums disclosed.

To determine by inspection of a drawing whether or not a particular pendulum design may operate according to the invention is difficult unless one has firmly in mind the required conditions that must be met. The easiest way to reach an understanding of these conditions is to analyze the mechanics of the pendulums and examine the effects of various factors separately and add the effects to get the overall result.

In Figures XXVIII, XXIX, and the following analysis let:

$P=$ the pull exerted at the steelyard rod when the pendulum track is vertical. (Not necessarily the pull when the indicator stands at zero.)
$K=$ change in pull per unit of angular rotation of the pendulum.
$a=$ radius of the power sector.
$b=$ radius of the sector concentric with the turning axis.
$c=$ eccentricity of the power sector.
$F=$ force applied to concentric sector of fixed center pendulum.
$W=$ weight of a pendulum, assumed concentrated at its center of gravity.
$\theta=$ rotation of the pendulum measured from a position where the track is vertical. (Range may include positive and negative values.)
$\phi=$ angle between the power ribbon and a vertical line. It is a complex function of $\theta$.
$\alpha=$ departure of the line of centers of the sectors from perpendicularity with the track. Usually a very small angle.
$L$ and $M=$ coordinates of the center of gravity with respect to the axis of rotation measured parallel and perpendicular to the track. M is the "locus shift" referred to above.

Referring to Figure XXVIII and taking moments about 0:

(1)
$$\frac{P+K\theta}{\cos \phi}(a+c \cos (\theta+\alpha+\phi))=$$
$$bW+b(P+K\theta)+W(L \sin \theta +M \cos \theta)$$

Collecting terms:

(2)
$$(P+K\theta)\left(\frac{a+c \cos (\theta+\alpha+\phi)}{\cos \phi}-b\right)=$$
$$bW+WL \sin \theta+WM \cos \theta$$

Substituting $f(\theta)$ for the load moment arm:

(3) $(P+K\theta)f(\theta)=bW+WL\sin\theta+WM\cos\theta$

Referring now to Figure XXIX and taking moments about 0:

(4)
$$\frac{P+K\theta}{\cos\phi}(a+c\cos(\theta+\alpha+\phi))=bF+(L\sin\theta+M\cos\theta)W$$

Substituting $f(\theta)$ for the load moment arm:

(5) $(P+K\theta)f(\theta)=bF+WL\sin\theta+WM\cos\theta$

Where $f(\theta)$ is the effective power arm.

In comparing Equation 3 for the floating and Equation 5 for the fixed center pendulums it should be noted that the weight W of the floating pendulum applied at the fulcrum sector radius $b$ corresponds functionally to the force F applied at the radius $b$ of the fixed center pendulum. Furthermore the factor $b$ appears in the power arm $f(\theta)$ of the floating pendulum but not in the fixed center type. Otherwise the equations are identical.

One feature of the improved pendulum is that the capacity of the pendulum may be altered by a single adjustment without affecting its other characteristics. Since $K\theta$ is the net load the incremental change in load is $\Delta K\theta$. This change is to be accomplished by a variation $\Delta L$ in the position of the weight along the track.

For any position of the pendulum the change in moment resulting from the movement of the weight is equal to $\Delta LW\sin\theta$. This change in moment is to counterbalance a corresponding change in load that is proportional to pendulum rotation. Therefore the change in load at any pendulum position multiplied by the effective power arm at that position must equal the change in counterbalancing moment.

Thus:

(6) $\qquad(\Delta K\theta)$ (power arm) $=\Delta LW\theta$ or (7) $\qquad$ power arm $=\dfrac{\Delta LW}{\Delta K}\dfrac{\sin\theta}{\theta}$ Since the first term on the right is independent of pendulum position it follows that the power arm must be proportional to $(\sin\theta)/\theta$.

Substituting $(\sin\theta)/\theta$ for $f(\theta)$ in Equations 3 or 5 allows each to be broken down into two equations each of which must be separately satisfied:

(8) $\qquad K\theta\dfrac{\sin\theta}{\theta}=WL\sin\theta$ $\qquad K=WL$ and (9) $\qquad P\dfrac{\sin\theta}{\theta}=bF+WM\cos\theta$ Replacing each of the trigonometric terms with its equivalent power series, equating like powers of $\theta$ and solving gives to a first approximation:

(10) $\qquad P=bF+WM$ and, from the $\theta^2$ terms

(11) $\qquad bF=2WM$

Since this approximation neglects higher powers of $\theta$ it is not precisely accurate and the actual pendulum dimensions depart slightly from this relationship to take into effect the correction terms resulting from the higher powers of $\theta$.

In the actual pendulums Equation 10 (with proper constants) gives the pull exerted on the steelyard rod when the track stands vertical while Equation 11 gives the proportions to be satisfied so that Equation 9 is satisfied for all values of $\theta$ and so that P is independent of $\theta$, i. e., constant throughout pendulum travel. With the particular function for the power arm the change in load with pendulum rotation as expressed in Equation 8 is exactly linear for all values of L and variation of L (moving the weight along the track) serves to adjust K (the capacity factor) without affecting other characteristics of the pendulum.

The straight line adjustment, which is made once regardless of capacity, is to satisfy Equation 11. In the fixed center pendulums it is more convenient and economical to vary F and P as by adding (or removing) slugs and weight to the pendulum loading frame and platter shot box.

In the floating pendulum design, where the weight of the pendulum replaces the force F, the corresponding equation is:

(11a) $\qquad bW=2WM$ or $\qquad b=2M$

Since $b$ is the radius of the fulcrum sector and therefore fixed, M is made variable as by moving the subweight perpendicular to the track. This adjustment, of course, produces a corresponding change in P.

In actual pendulums slightly better overall results are obtained if $f(\theta)$ varies slightly from $(\sin\theta)/\theta$ at the first and third quarters of the pendulum travel. This allows the residual error in the counterbalancing of the initial force P to be reduced by the error introduced into net load weighing to give a better overall accuracy particularly when P is large compared with the maximum value of $K\theta$.

If $b$ or F is zero (which can occur only in the fixed center pendulums) then M is also zero and as a result P is zero. Thus such a pendulum goes to zero total load when the track is vertical and the center of gravity lies on a line passing through the axis of rotation and parallel to the track $(M=0)$.

Various modifications may be made in the details of construction to adapt the improved counterbalancing mechanism to specific scale constructions without departing from the spirit and scope of the invention.

Having described the invention, I claim:

1. In a pendulum counterbalance for a weighing scale, in combination, a pendulum having an axis of rotation, a power sector that is eccentric to the axis of rotation, another sector that is concentric with the axis of rotation, means for tangentially applying load forces to the eccentric sector, means for tangentially applying a predetermined force to the concentric sector, a straight track included in the pendulum and extending substantially perpendicular to the line of centers of the sectors and a weight mounted on the track, said weight being of such mass and shape that the composite center of gravity of the pendulum and weight lies on a line that is parallel to the track and that is spaced from a parallel line passing through the axis of rotation.

2. A pendulum for use in an automatic load counterbalancing mechanism, comprising a pendulum that rotates about a fixed axis to counterbalance a load, an eccentric power sector included in the pendulum, an auxiliary sector that is included in the pendulum and is concentric with respect to the fixed axis, means for applying a predetermined force to the auxiliary sector, a track formed on the pendulum, and a weight carried on the track and movable therealong, said track being angularly oriented with respect to a line through the fixed axis and the center of the power sector such that for all positions of said weight the half scale counterbalancing force of the pendulum is equal to the average of the zero and full scale counterbalancing force.

3. In an automatic load counterbalancing mechanism, in combination, a pendulum having a fixed axis about which the pendulum turns in counterbalancing a load, a power sector included in the pendulum body, said power sector being eccentric to the turning axis, means employing a member overlying the power sector for applying load force to the pendulum, a rectilinear track forming part of the pendulum body, said track extending substantially perpendicular to a line drawn through the center of the power sector and the turning axis, a weight mounted on the track, at least one auxiliary sector included in the pendulum, and a weight suspended from a member overlying the auxiliary sector.

4. In an automatic load counterbalancing mechanism, in combination, a pendulum having a fixed axis about which the pendulum rotates in counterbalancing a load, a power sector included in the pendulum, said power sector being eccentric to the turning axis, means including a member overlying the sector for applying load force to the pendulum, a rectilinear track forming part of the pendulum, said track being substantially perpendicular to a line through the fixed axis and the center of the power sector, a weight adjustably mounted on the track, at least one auxiliary sector included in the pendulum located concentric with the fixed axis, suspension means overlying such auxiliary sector, and a balance weight container suspended from said means, said balance weight container being loaded to secure correct half capacity indication.

5. In an automatic load counterbalancing mechanism, in combination, a rigid pendulum body having a fixed axis about which the pendulum rotates in counterbalancing a load, a power sector forming part of the pendulum body, said power sector being eccentric to the turning axis, means including a member overlying the sector for applying load force to the pendulum, a rectilinear track forming part of the pendulum body, said track being substantially perpendicular to a line through the fixed axis and the center of the power sector, a weight adjustably mounted on the track, said weight being proportioned such that a line passing through the composite center of gravity of said pendulum body and said weight and parallel to said track passes the fixed axis on the side oposite the power sector, at least one auxiliary sector formed on the pendulum concentric with the fixed axis, and means including a flexible member overlying the auxiliary sector for applying a predetermined load counterbalancing force to the pendulum body.

6. In an automatic load counterbalancing mechanism, in combination, a pendulum that is mounted for rotation about a fixed axis, an eccentric power sector included in the pendulum to which sector load forces are applied, a track included in the pendulum, said track extending generally perpendicular to a line through the center of the power sector and the fixed axis, a weight mounted on the track, an auxiliary sector in the pendulum and located concentric with respect to the fixed axis, an elastic member connected to a ribbon overlying the concentric sector, said elastic member cooperating with a component of force of said weight to offset initial load.

7. In an automatic load counterbalancing mechanism, in combination, a pendulum that is mounted for rotation about a fixed axis, an eccentric power sector included in the pendulum to which sector load forces are applied, a track included in the pendulum, said track extending generally perpendicular to a line through the center of the power sector and the fixed axis, a weight mounted on the track, an auxiliary sector on the pendulum concentric with respect to the fixed axis, a spring connected to a ribbon overlying the concentric sector, and means for adjusting the rate of the spring, said spring cooperating with a component of force of said weight to offset initial load and an adjustable proportion of the net load.

8. In an automatic load counterbalancing mechanism, in combination, a pair of pendulums that are mounted for rotation about fixed axes, eccentric power sectors included in the pendulums, a track on each pendulum that extends generally perpendicular to a line passed through the center of the eccentric power sector and the fixed axis, weights mounted on the tracks, at least one sector included in each pendulum concentric with the turning axis, a frame, flexible members overlying the concentric sectors for supporting the frame, and means for driving an indicator according to movement of the frame.

9. In an automatic load counterbalancing mechanism, in combination, a pair of pendulums that are mounted for rotation about fixed axes, eccentric power sectors included in the pendulums, a track on each pendulum that extends generally perpendicular to a line passed through the center of the eccentric power sector and the fixed axis, weights mounted on the tracks, at least one sector included in each pendulum concentric with the turning axis, a frame having surfaces juxtaposed to the concentric sectors, flexible members overlying the concentric sectors for supporting the frame, and means for driving an indicator according to movement of the frame.

10. In an automatic load counterbalancing mechanism, in combination, a pair of pendulums that are mounted for rotation about fixed axes, eccentric power sectors included in the pendulums, a track on each pendulum, weights mounted on the tracks, at least one sector included in each pendulum concentric with the turning axis, a frame having surfaces juxtaposed to the concentric sectors, flexible members overlying the concentric sectors for supporting the frame, and means for driving an indicator according to movement of the frame.

11. In an automatic load counterbalancing mechanism, in combination, a pair of pendulums that are mounted for rotation about fixed axes, eccentric power sectors included in the pendulums, a track on each pendulum that extends generally perpendicular to a line passed through the center of the eccentric power sector and the fixed axis, weights mounted on the tracks, at least one sector formed on each pendulum concentric with the turning axis, a frame, flexible members overlying the concentric sectors for supporting the frame, and receptacles in the frame providing loading boxes for the reception of adjusting weights.

12. In an automatic load counterbalancing mechanism, in combination, a pair of pendulum bodies that are mounted for rotation about fixed axes, eccentric power sectors formed on the bodies, a track on each pendulum body that extends generally perpendicular to a line passed through the center of the eccentric power sector and the fixed axis, weights mounted on the tracks, at least one sector formed on each pendulum concentric with the turning axis, a frame having rigid surfaces juxtaposed to the concentric sectors, flexible members overlying the concentric sectors for supporting the frame, and means for driving an indicator according to movement of the frame.

13. In an automatic load counterbalancing mechanism, in combination, a pair of pendulums that are mounted for rotation about fixed axes, eccentric power sectors included in the pendulums, a track on each pendulum body that extends generally perpendicular to a line passed through the center of the eccentric power sector and the fixed axis, weights mounted on the tracks, at least one sector formed on each pendulum concentric with the turning axis, a frame, flexible members overlying the concentric sectors for supporting the frame, shelves forming part of the frame for supporting adjusting weights, and means for retaining the weights on the shelves.

14. In an automatic load counterbalancing mechanism, in combination, a pair of pendulums, at least one sector included in each pendulum which sector is located concentric with respect to the turning axis of the pendulum, a power sector included in each pendulum and located eccentrically to the turning axis, a track formed in each pendulum and extending generally perpendicular to the line of centers of the sectors, means for tangentially applying load forces to the power sector, means for tangentially applying force to the concentric sector, said last named means serving to support the pendulum, and a weight mounted on the track for determining the load counterbalancing capacity of the pendulum.

15. In an automatic load counterbalancing mechanism, in combination, a pendulum body, a cylindrical surface formed on the pendulum body concentric with respect to its turning axis, a power sector that is formed on the pendulum body eccentric to the turning axis, a straight track formed on the pendulum body and oriented to stand vertical when the moment arm of the load force acting on the pendulum is a maximum, said sectors and said track being rigidly connected and non-adjustable with respect to each other, and at least one weight adjustably mounted on the track for adjustably locating the composite center of gravity of the pendulum body and weight.

16. A pendulum assembly for a weighing scale, the pendulum comprising a member having fulcrum means for supporting the pendulum, a power sector over which a load supporting ribbon may be trained, the power sector being eccentric to the turning center of the pendulum, and a track that is fixed to the sector and that is substantially perpendicular to a line passing through the turning center of the pendulum and the center of curvature of the power sector, a weight that is movable along the track, a second track at right angles to the first track, and a weight movable along the second track.

17. A pendulum for a weighing scale, the pendulum comprising a member having a fulcrum sector, a power sector eccentric to the fulcrum sector and a first track fixed to the sectors, said track being arranged to be vertical when the line of centers of the sectors is substantially perpendicular to the line of action of the force applied to the power sector, a weight movable along the track, a second track at right angles to the first track, and a weight movable along the second track, said member and said weights being proportioned so that a line passed through the center of gravity of the assembly parallel to the first track passes on the opposite side of the center of the fulcrum sector from the sectors.

18. In a pendulum for a weighing scale in which a flexible ribbon transmits the load force to the pendulum, a pendulum body comprising a power sector to which the flexible ribbon may be attached, an auxiliary sector the center of which is displaced from the center of the power sector, and a weight supporting track that is arranged at an angle to the line of centers of the sectors, the angle being substantially equal to the angle between the flexible ribbon and a horizontal plane when the pendulum is in use.

19. In a pendulum for use in an automatic weighing scale, in combination, a pendulum body having an axis of rotation, a sector eccentric to the axis of rotation included in the pendulum body, a flexible member for tangentially applying load force to the eccentric sector, a sector concentric to the axis of rotation, a flexible member for tangentially applying force to the concentric sector in opposition to the load force, a straight track on the pendulum that stands vertical when the line of centers of the sectors is substantially perpendicular to the tangentially extending portion of the load applying flexible member, and a weight mounted on the track and adjustable therealong, said weight having its mass distributed so that the center of gravity of the pendulum body and weight when said track is vertical is displaced horizontally to that side of the vertical plane through the axis of rotation toward which the track swings with an increase in load on the pendulum.

20. A pendulum body according to claim 19 in which the rectilinear track is substantially perpendicular to the line of centers of the sectors.

21. A pendulum body according to claim 19 in which the second sector serves as a fulcrum sector and the force applied thereto supports the pendulum body against gravity and the force applied to the eccentric sector.

22. A pendulum body according to claim 19 in which the eccentric sector, the second sector, and the rectilinear track are comprised in a single machined element.

23. In a pendulum counterbalance for a weighing scale, in combination, a pendulum having an axis of rotation, a first sector included in the pendulum and having a center eccentric to the axis of rotation, at least one other sector included in the pendulum and having its center at the axis of rotation, means for tangentially applying load force to the eccentric sector, the line of action of said means being substantially perpendicular to the line of centers of the sectors at a selected position in the range of rotation of the pendulum, a track on the pendulum that stands vertical at said selected position of the pendulum, a weight mounted on the track, the composite center of gravity of the pendulum and weight being displaced horizontally from a vertical plane through the axis of rotation at said selected position of the pendulum in the direction that the weight moves as the pendulum rotates in response to an increase in load, and means for tangentially applying force to said other sector in opposition to the force applied to the eccentric sector.

LAWRENCE S. WILLIAMS.

REFERENCES CITED

The following references are of record in the file of this patent:

UNITED STATES PATENTS

| Number | Name | Date |
|---|---|---|
| 1,454,047 | Emery | May 8, 1923 |
| 1,878,192 | Scott | Sept. 20, 1932 |
| 1,890,977 | Kelley | Dec. 13, 1932 |
| 2,294,819 | Williams | Sept. 1, 1942 |
| 2,368,010 | Eash | Jan. 23, 1945 |

FOREIGN PATENTS

| Number | Country | Date |
|---|---|---|
| 473,068 | Great Britain | Sept. 27, 1937 |